Nov. 30, 1926.  
H. PARKER  
1,608,564  
MACHINE FOR MANUFACTURING TUBES AND OTHER HOLLOW BODIES FROM PULP  
Filed March 7, 1921   24 Sheets-Sheet 1

INVENTOR.  
Howard Parker.  
BY H. E. Hart  
ATTORNEY.

Nov. 30, 1926.

H. PARKER 1,608,564

MACHINE FOR MANUFACTURING TUBES AND OTHER HOLLOW BODIES FROM PULP

Filed March 7, 1921  24 Sheets-Sheet 3

Nov. 30, 1926.
H. PARKER
1,608,564
MACHINE FOR MANUFACTURING TUBES AND OTHER HOLLOW BODIES FROM PULP
Filed March 7, 1921    24 Sheets-Sheet 7

Inventor
Howard Parker

His Attorney

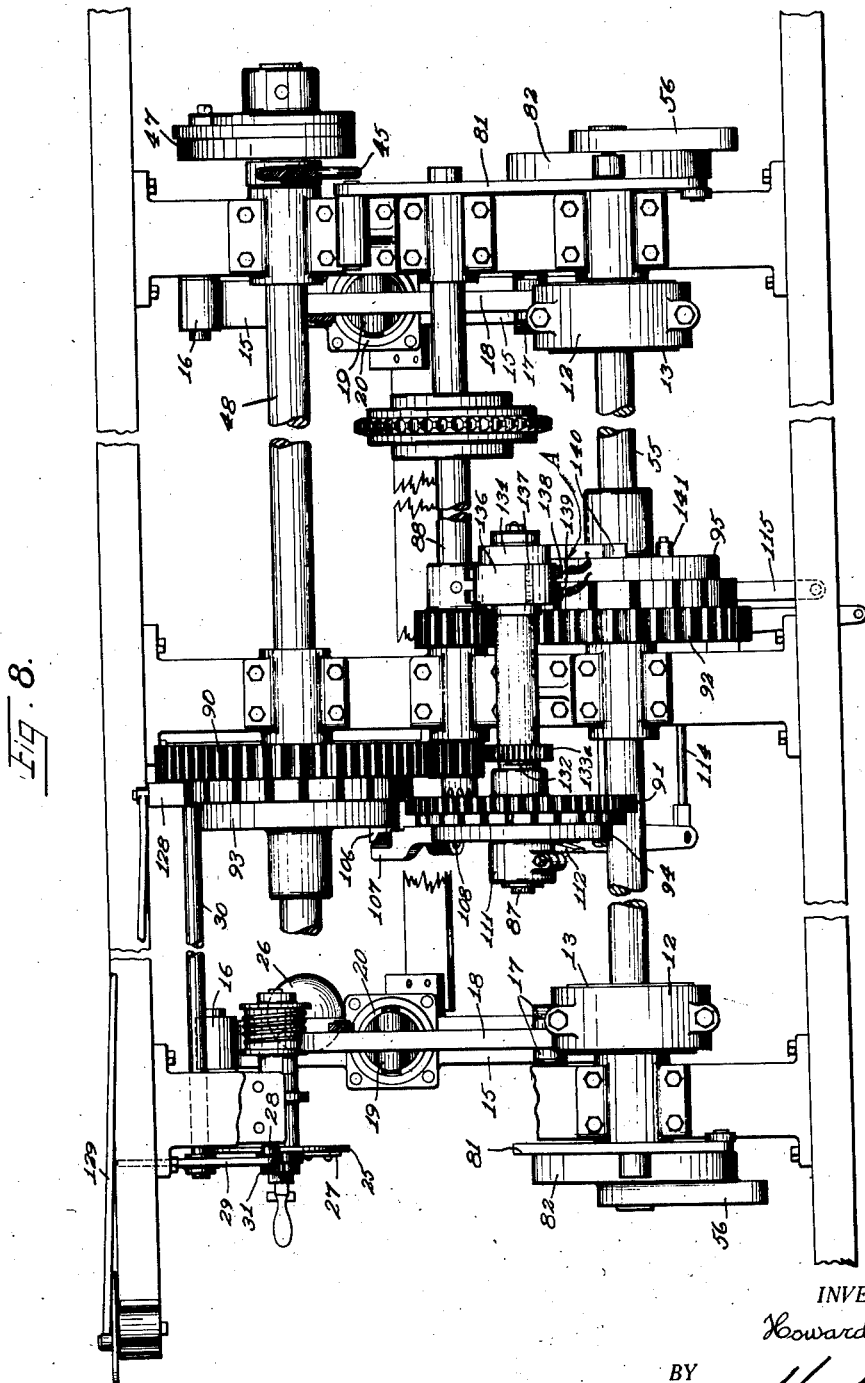

Nov. 30, 1926.  H. PARKER  1,608,564
MACHINE FOR MANUFACTURING TUBES AND OTHER HOLLOW BODIES FROM PULP
Filed March 7, 1921    24 Sheets-Sheet 9
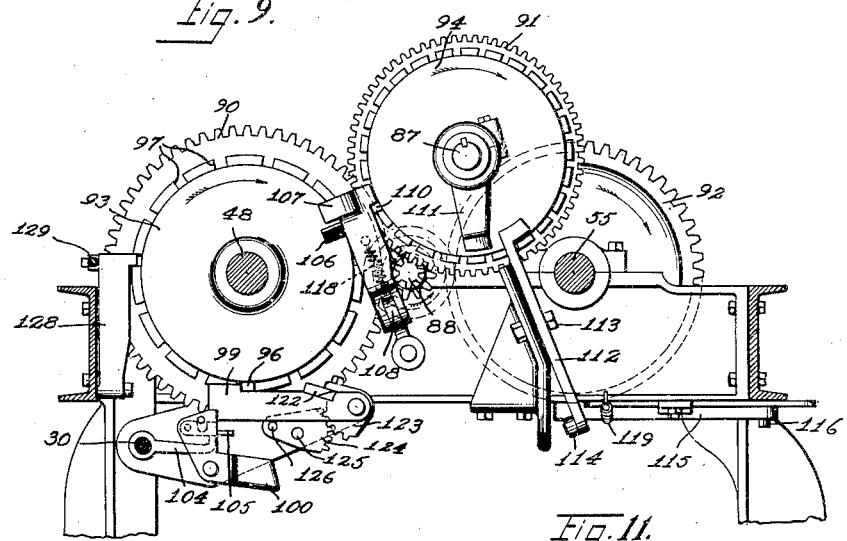
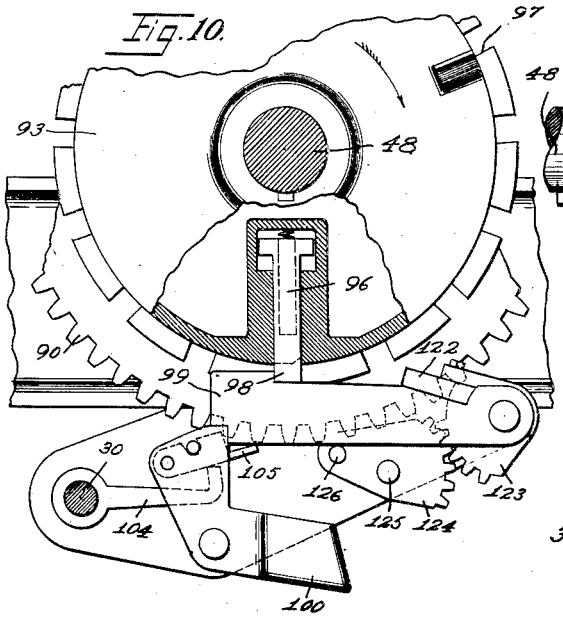
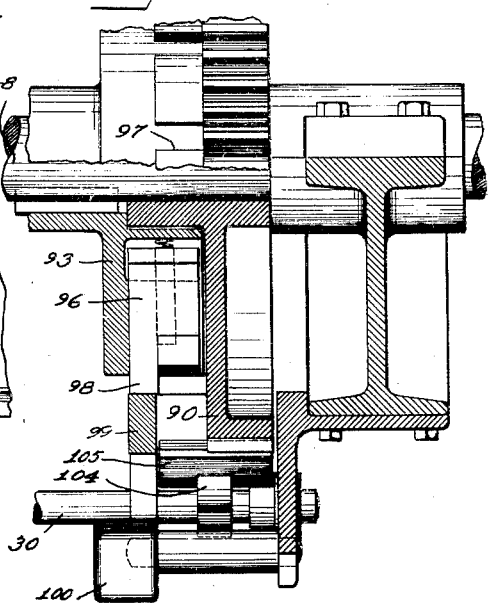
INVENTOR.
Howard Parker.
BY
Hu Hart
ATTORNEY.

Nov. 30, 1926. 1,608,564
H. PARKER
MACHINE FOR MANUFACTURING TUBES AND OTHER HOLLOW BODIES FROM PULP
Filed March 7, 1921 24 Sheets-Sheet 10
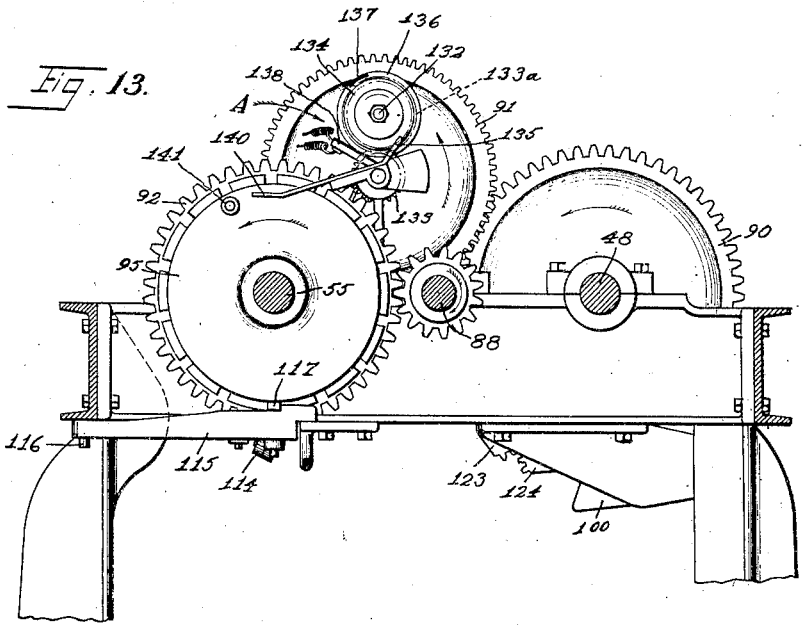
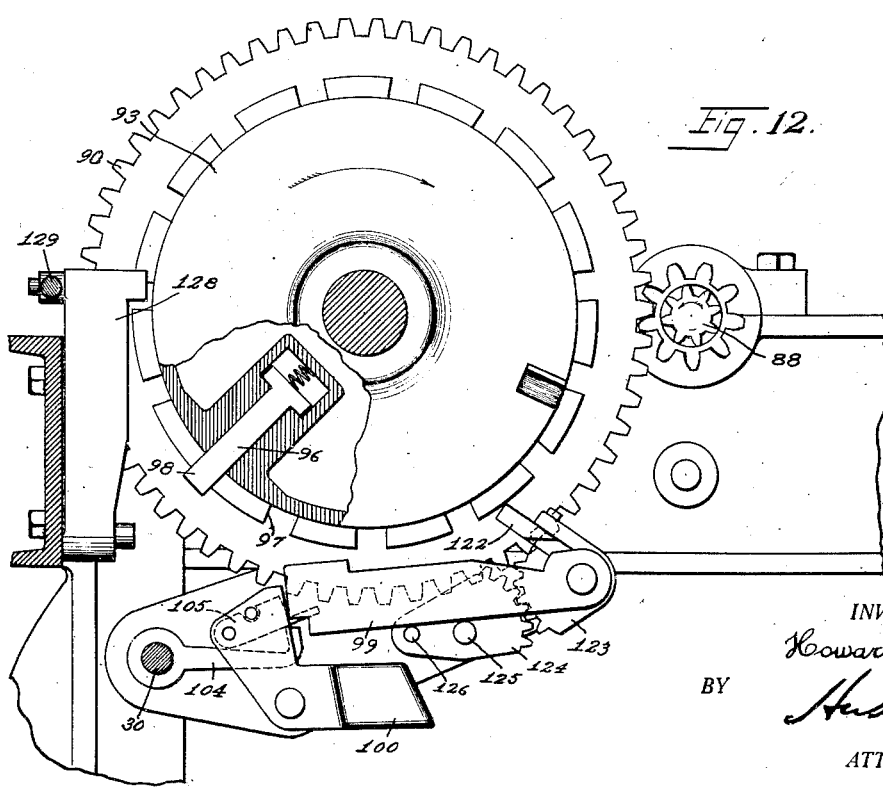
INVENTOR.
Howard Parker.
BY
ATTORNEY.

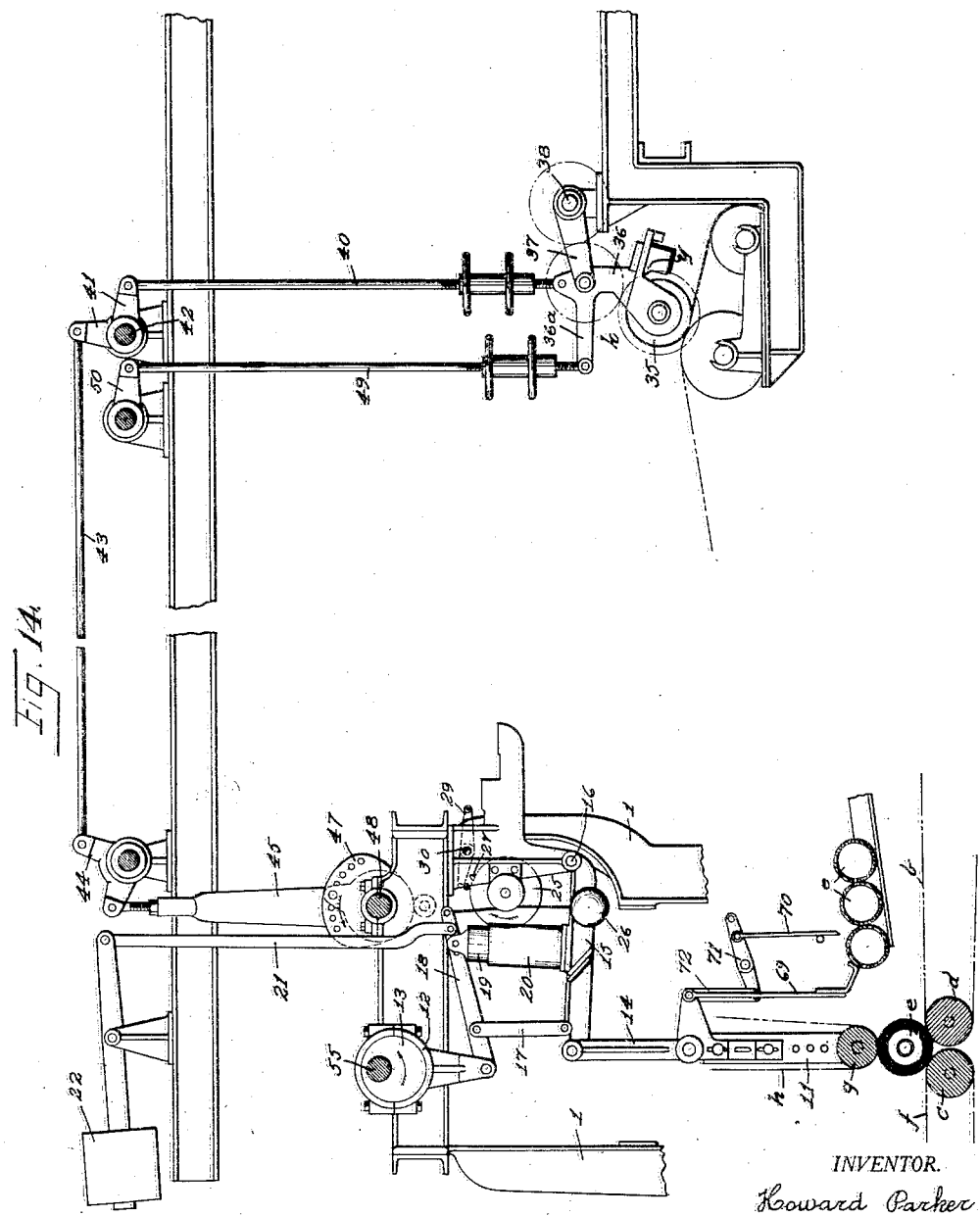

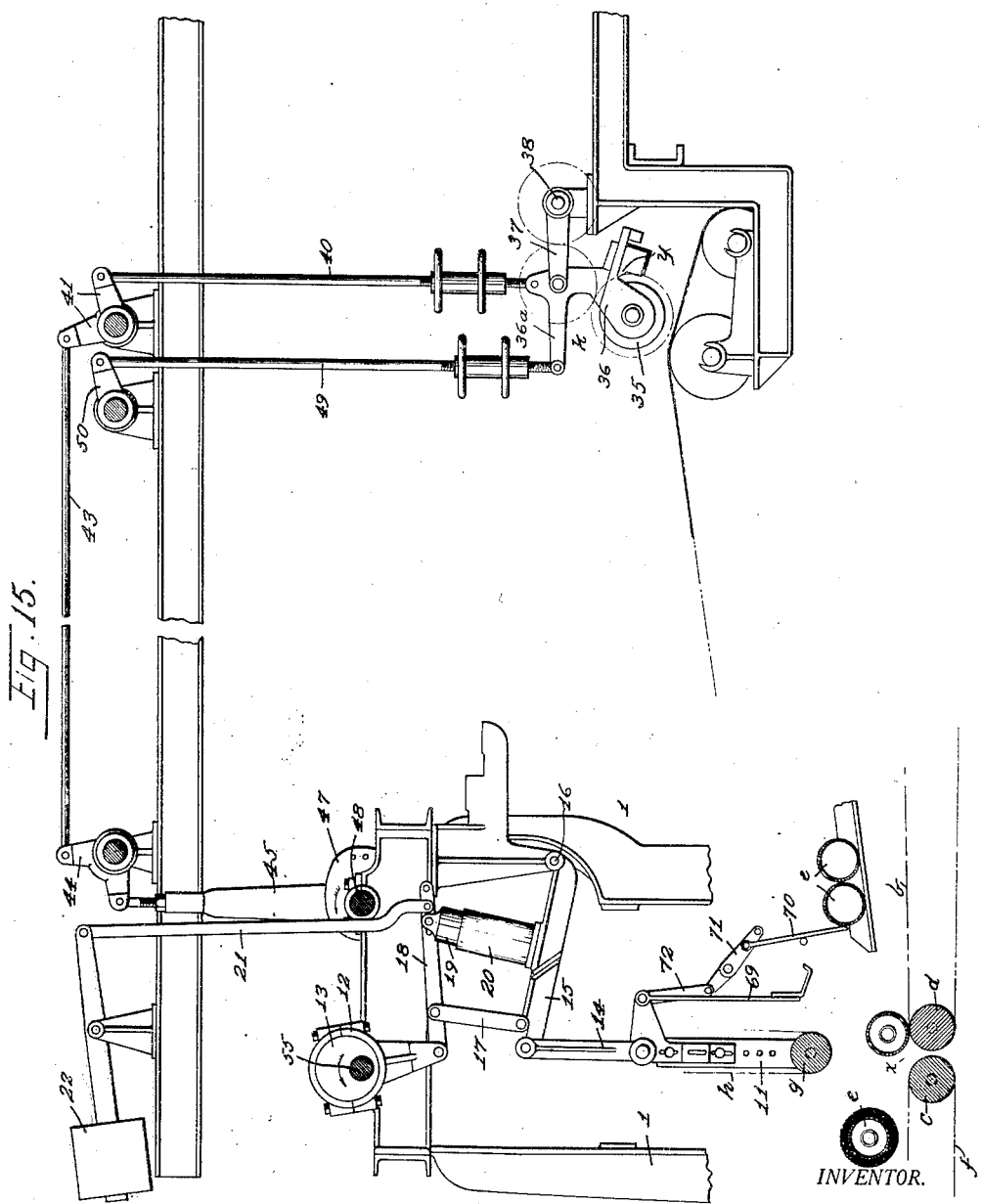

Nov. 30, 1926. 1,608,564
H. PARKER
MACHINE FOR MANUFACTURING TUBES AND OTHER HOLLOW BODIES FROM PULP
Filed March 7, 1921 24 Sheets-Sheet 13
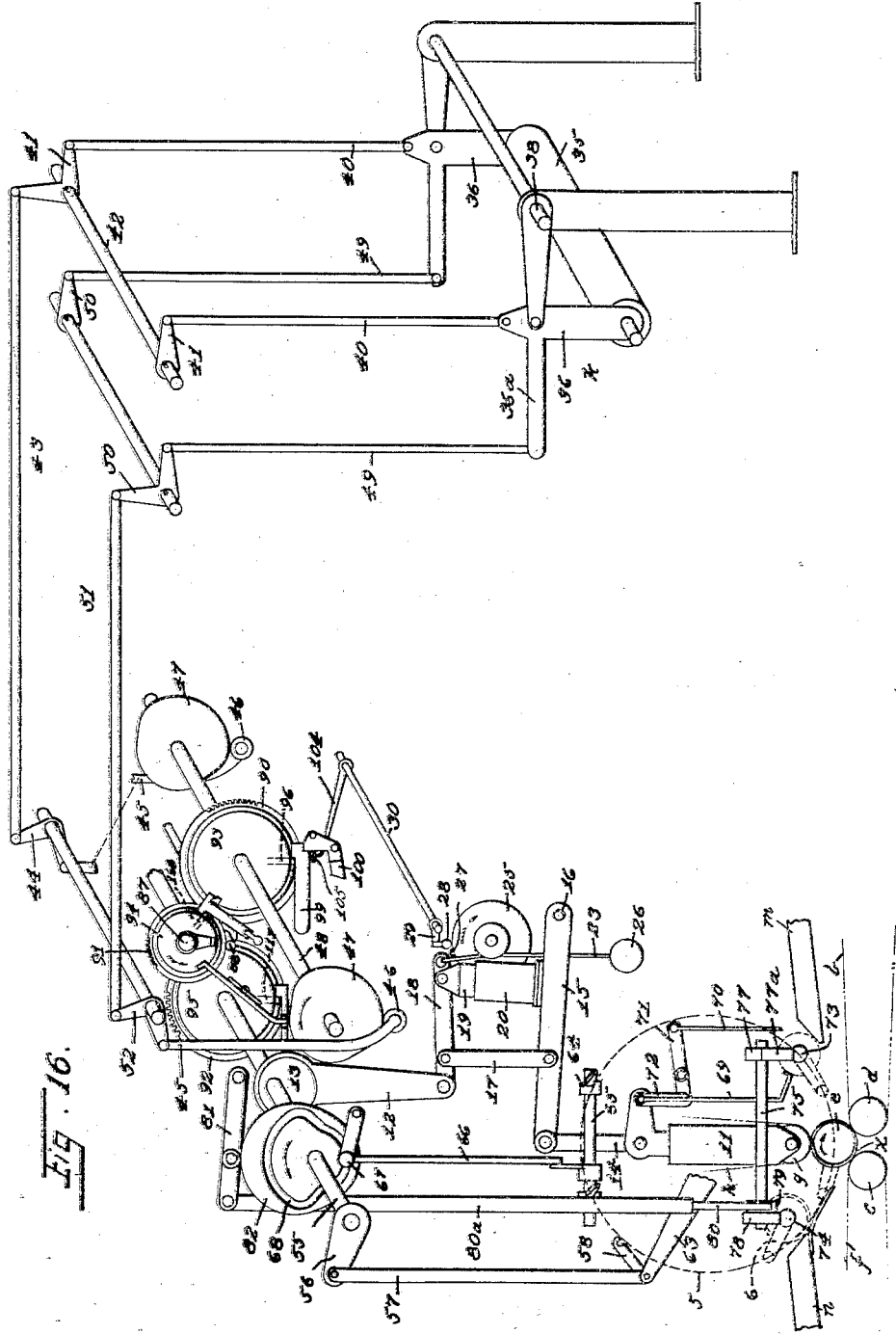
Inventor
Howard Parker
His Attorney

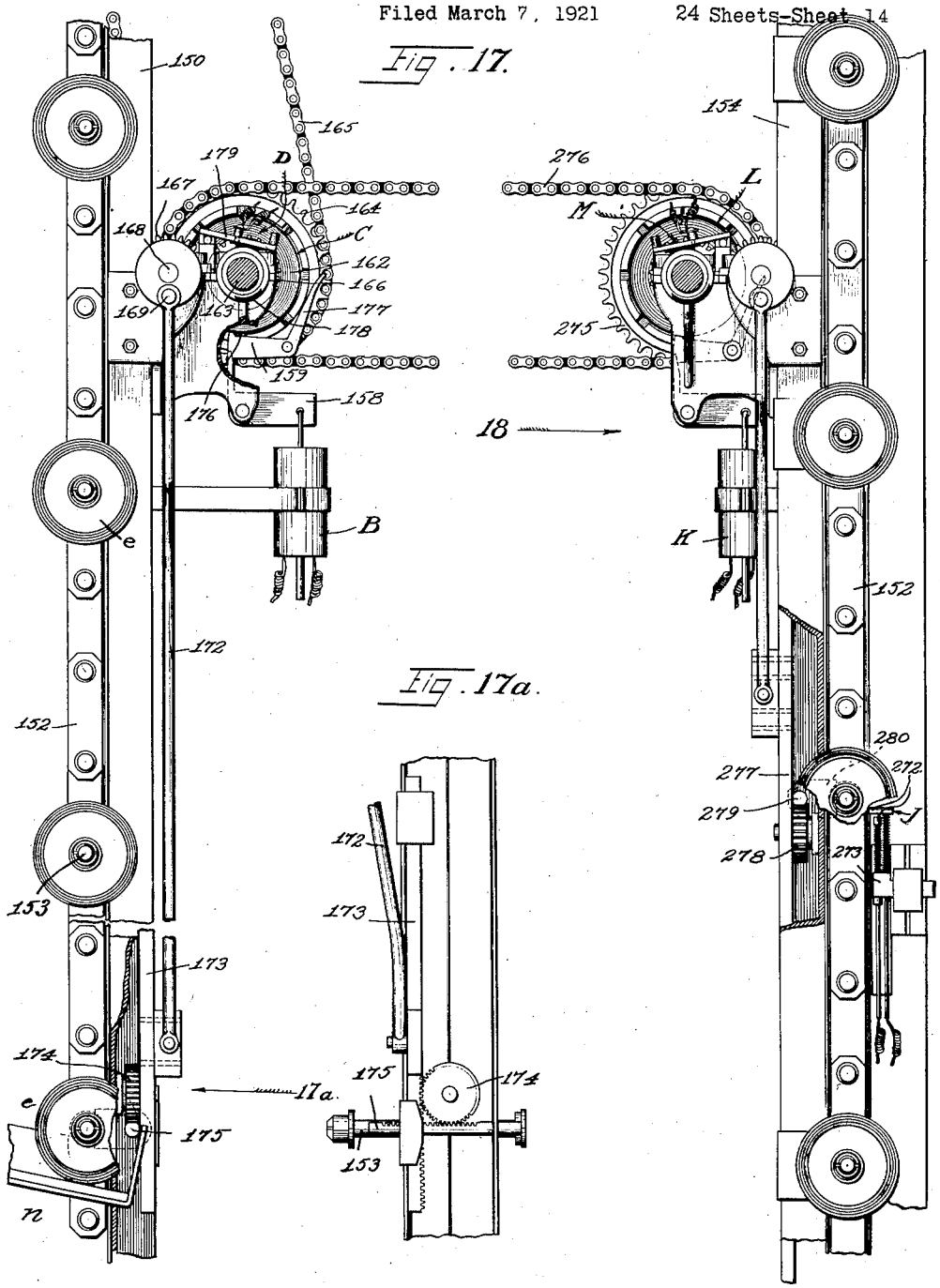

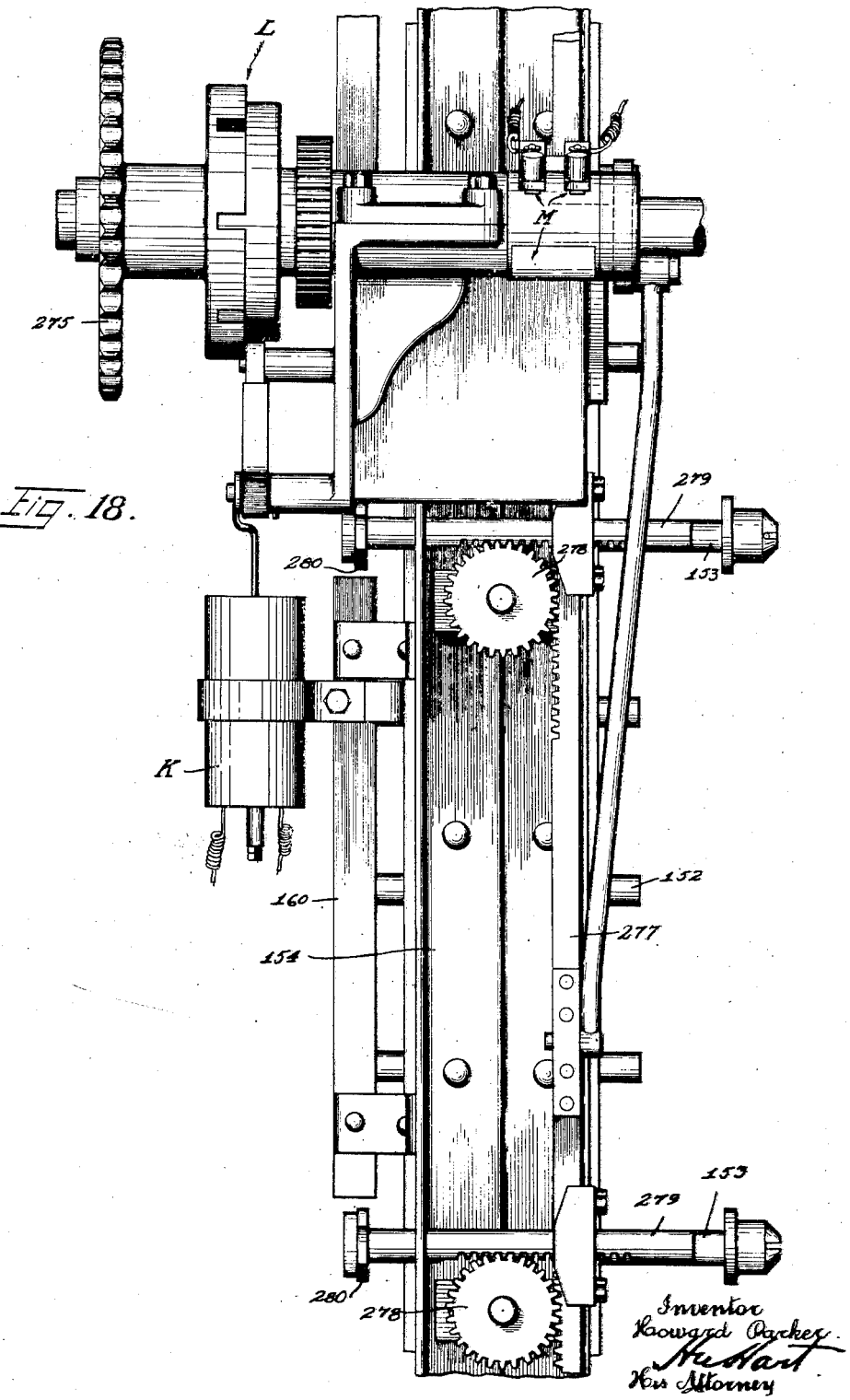

Nov. 30, 1926.

H. PARKER 1,608,564

MACHINE FOR MANUFACTURING TUBES AND OTHER HOLLOW BODIES FROM PULP

Filed March 7, 1921   24 Sheets-Sheet 16

Inventor
Howard Parker
His Attorney

Nov. 30, 1926.

H. PARKER 1,608,564

MACHINE FOR MANUFACTURING TUBES AND OTHER HOLLOW BODIES FROM PULP

Filed March 7, 1921    24 Sheets-Sheet 17

Inventor
Howard Parker
Hubbart
Attorney

Nov. 30, 1926. 1,608,564
H. PARKER
MACHINE FOR MANUFACTURING TUBES AND OTHER HOLLOW BODIES FROM PULP
Filed March 7, 1921 24 Sheets-Sheet 18
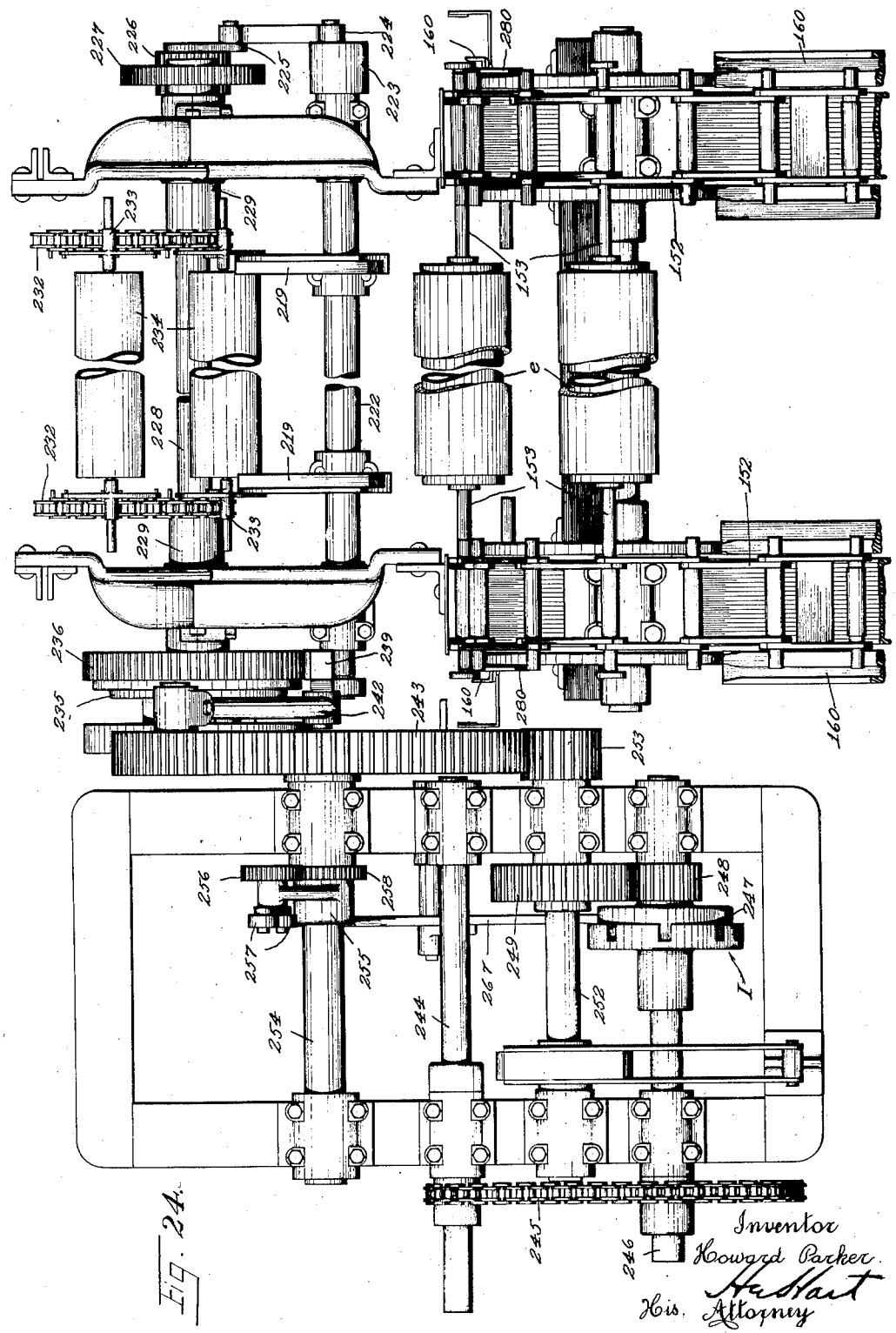

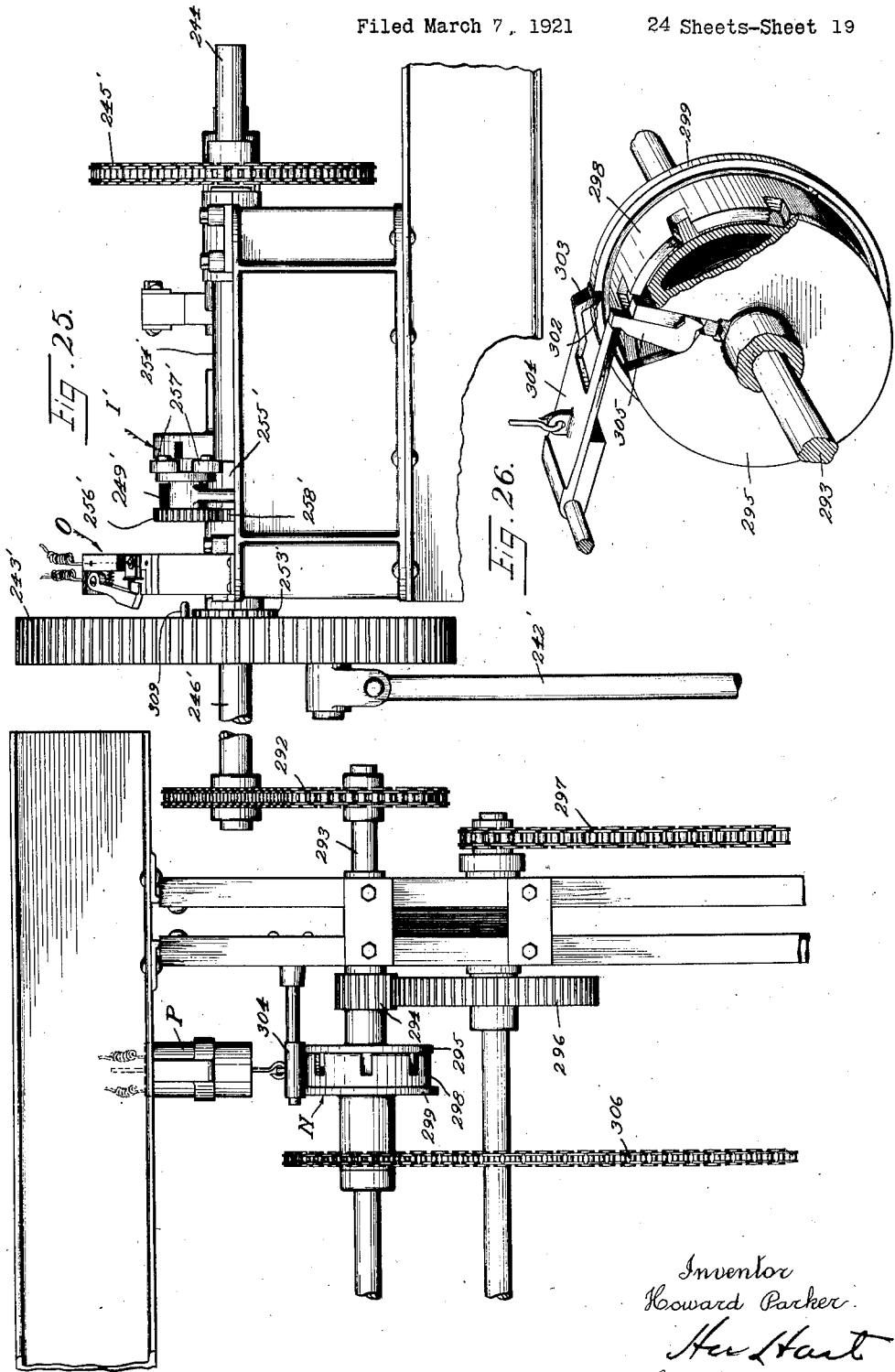

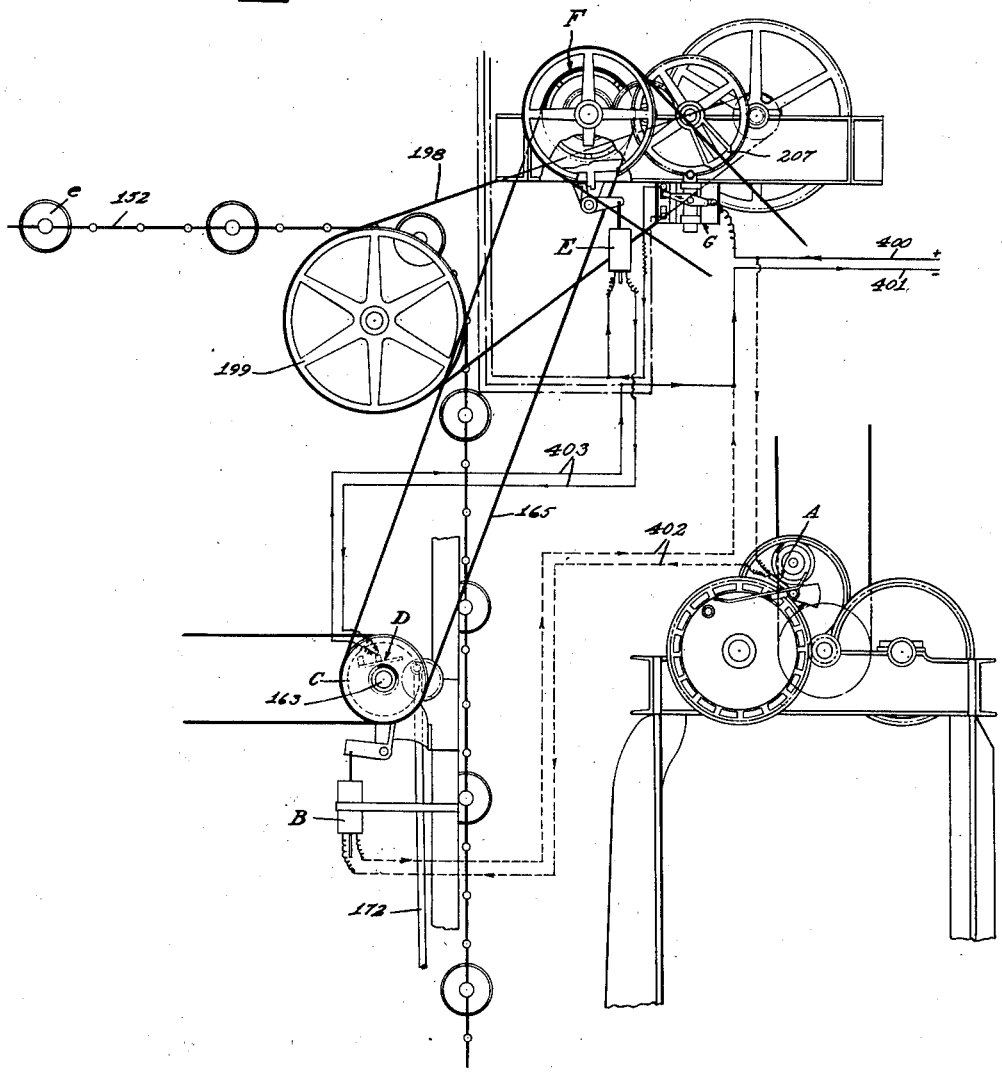

Nov. 30, 1926.  1,608,564
H. PARKER
MACHINE FOR MANUFACTURING TUBES AND OTHER HOLLOW BODIES FROM PULP
Filed March 7, 1921    24 Sheets-Sheet 21
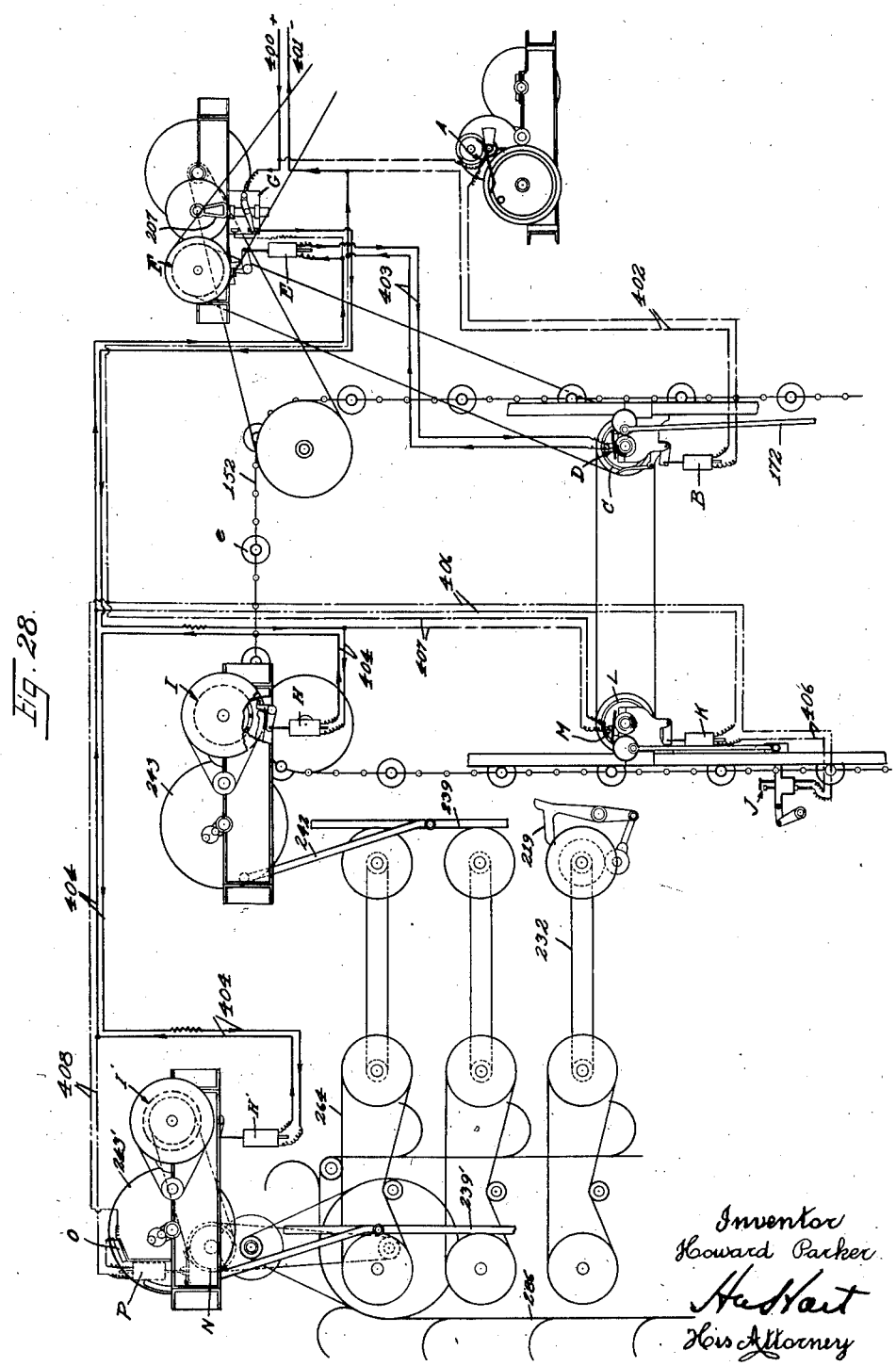

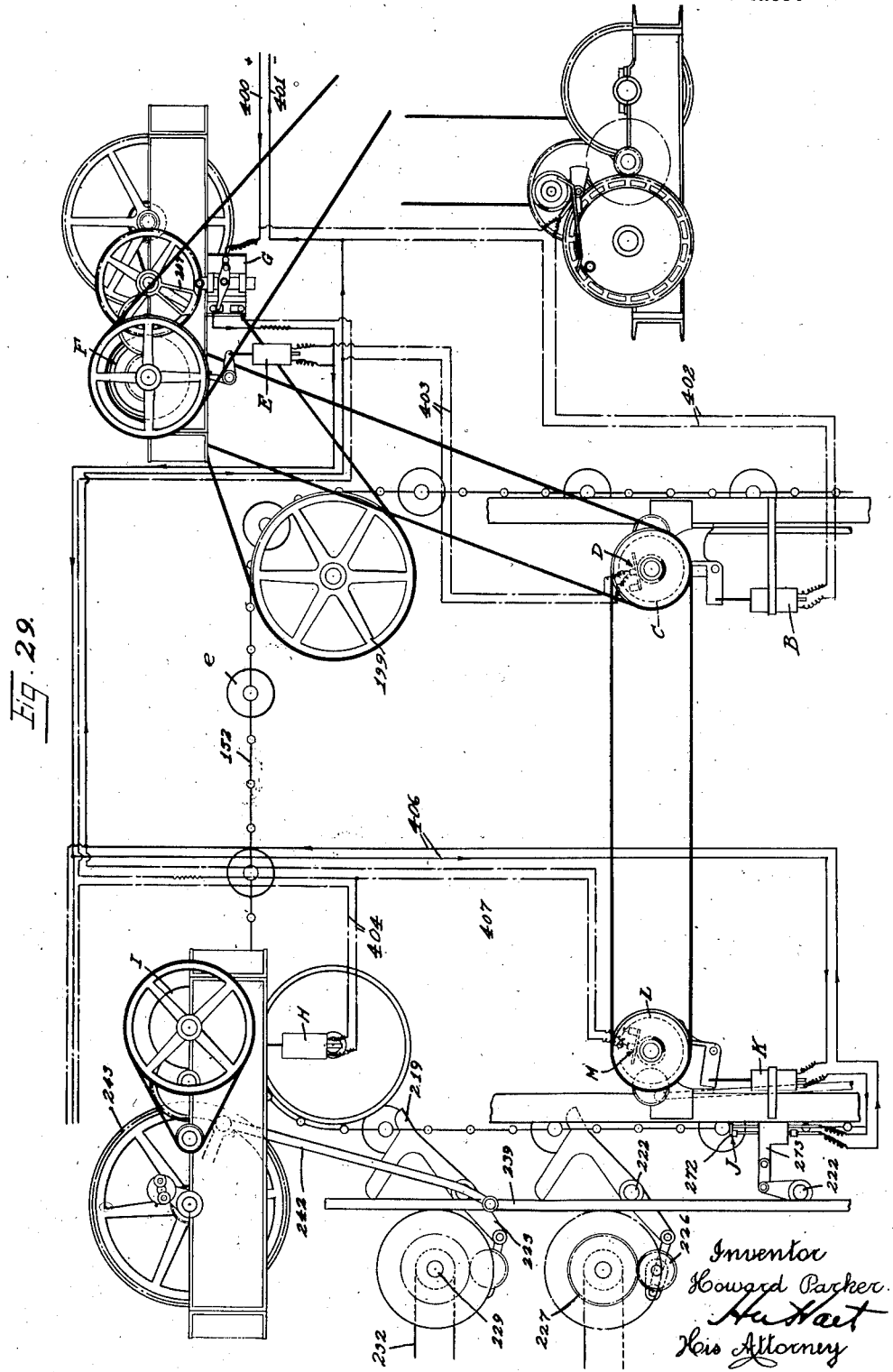

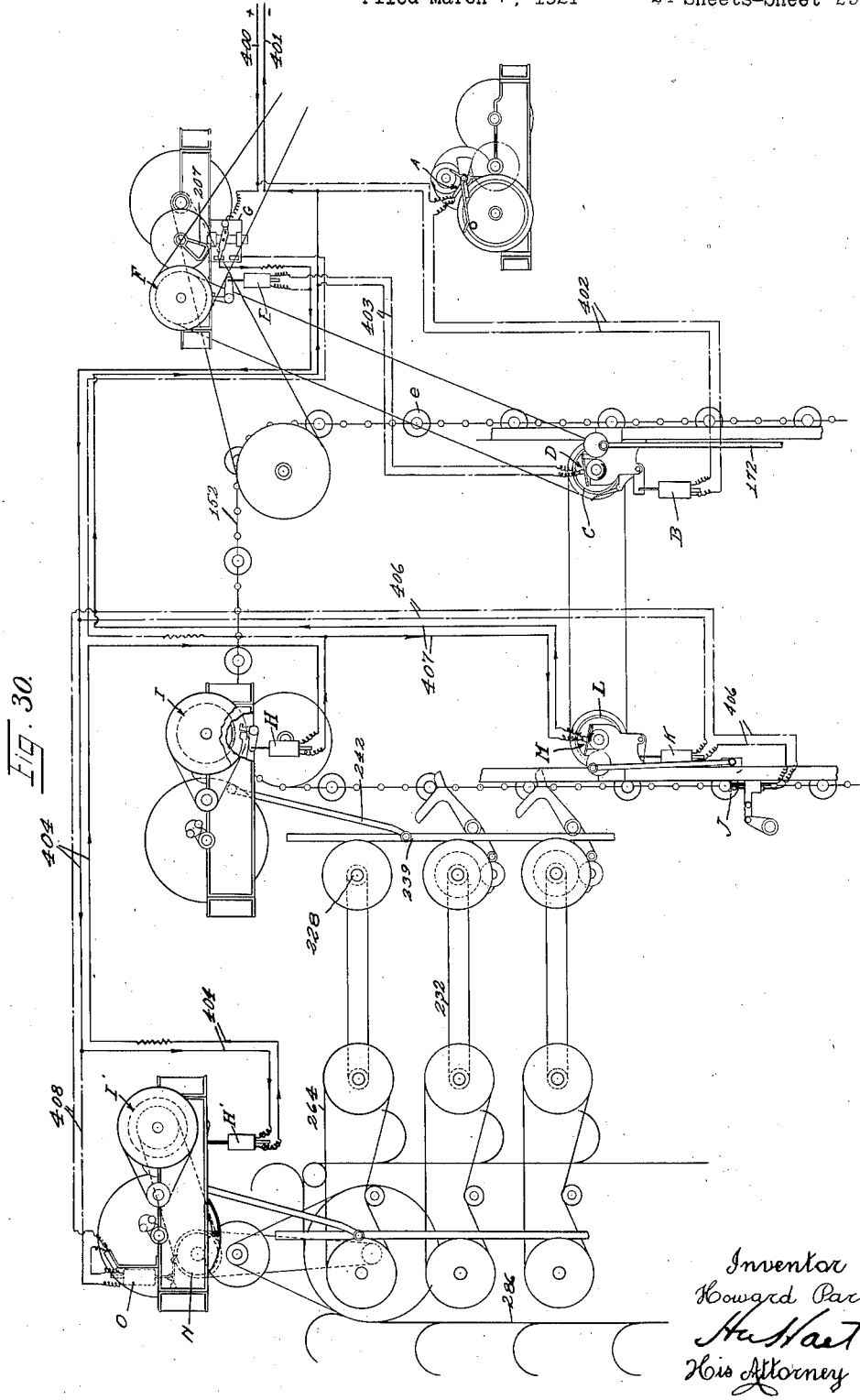

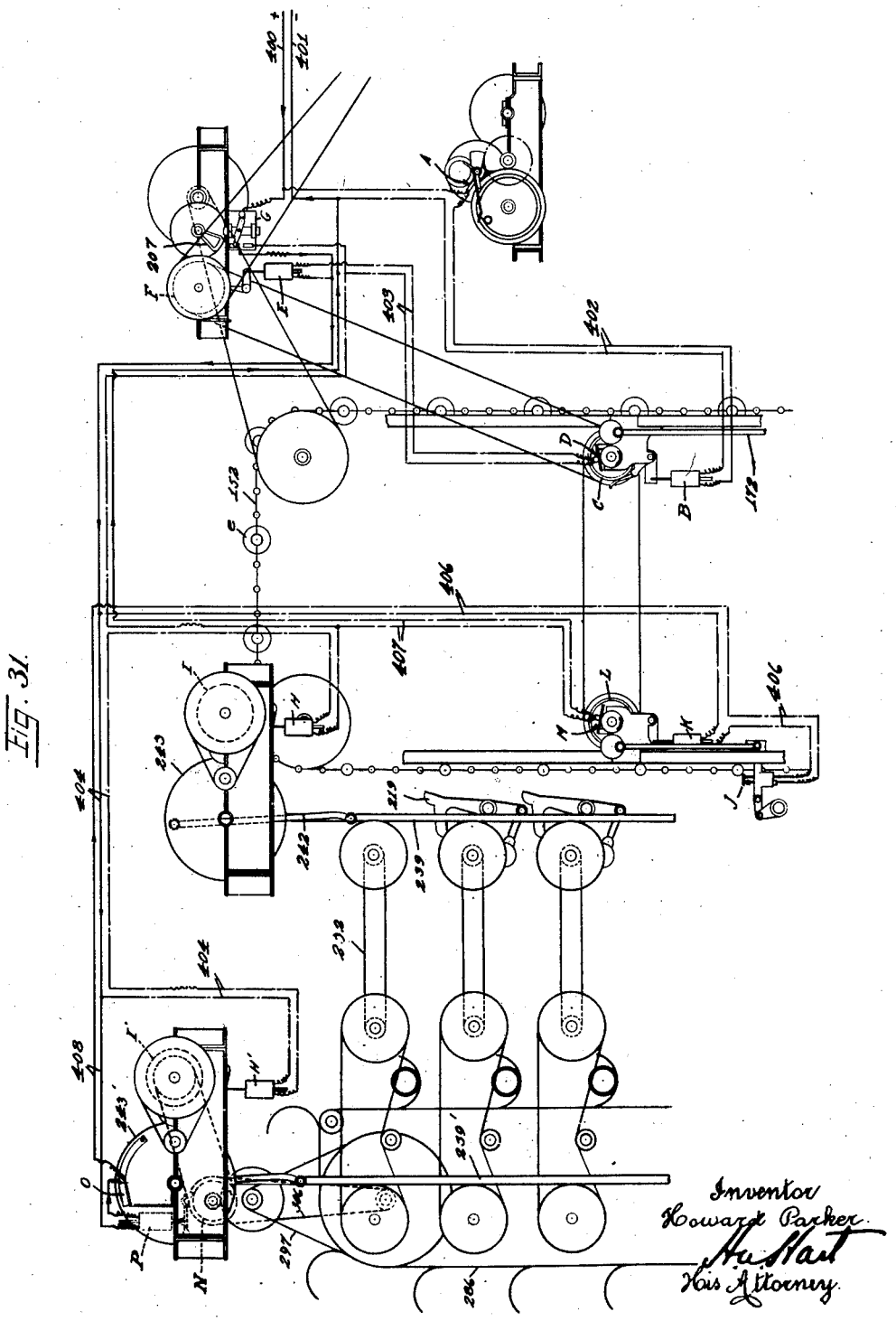

Patented Nov. 30, 1926.

1,608,564

UNITED STATES PATENT OFFICE.

HOWARD PARKER, OF BERLIN, NEW HAMPSHIRE, ASSIGNOR TO BROWN COMPANY, OF PORTLAND, MAINE, A CORPORATION OF MAINE.

MACHINE FOR MANUFACTURING TUBES AND OTHER HOLLOW BODIES FROM PULP.

Application filed March 7, 1921. Serial No. 450,370.

This invention relates to improvements in machines of the character described. The various features of invention will be described with reference to their use in the particular machine here selected for the purpose of illustration, which is a machine for making pipes or tubes by winding onto a mandrel a web of pulp just as it comes from the forming machine. I desire it to be clearly understood that the inventions or some of them are susceptible of other embodiments and adapted to the manufacture of other articles than tubes or pipes, and that the terms used herein are merely terms of description and not in any sense terms of limitation. It will be obvious that many of the features herein described are susceptible of modification to suit different requirements without departing from the spirit of the invention.

The art of making tubes or pipes from pulp and completing them ready for use involves first the formation of the tube, then the drying of the tube, then the treating of the tube to make it either water-proof or an electric insulator or both and, finally, in providing the tube with means for connecting together sections to constitute a continuous conductor.

Possibly the most important step in this complete procedure, at least one of the most important steps, is in the formation of the tube which is subsequently to be dried, treated, etc., for the success of the drying and treating and the strength of the finished tube is largely dependent upon the proper formation of the tube.

The present invention has to do with the initial formation of the tube and in general provides means for automatically handling the mandrels both to move them to and out of the winding position and for automatically controlling all other movements of the machine and of the mandrels both empty and full.

This invention is also concerned with the apparatus in which the tubes are dried and with the mechanism for automatically transferring the mandrels with tubes wound thereon from the tube forming machine to the drying machine, for it contemplates the control of the movement of the transfer mechanism and the mechanism of the drying machine by the action of the tube forming machine.

In an application which I filed on the 3rd day of December, 1915, under Serial No. 64,831, a machine for forming tubes, pipes, etc., by winding a web of pulp onto a mandrel is illustrated and described, which generally is of a type similar to the machine constituting the subject matter of this application and in some cases reference will be made to the above identified prior application for description of such features as are common to both machines.

In describing the figures of the drawings, let it be understood that that end of the machine from which the finished tubes are delivered by the carrier wheels to the receiving table will be referred to as the front of the machine; then the right hand side of the machine will be that side to the right of a person who stands facing the front end of the machine and the left side of the machine will be at the left side of a person so standing.

Fig. 1 is a general view of the right hand side of a tube forming machine constructed in accordance with the present invention.

Fig. 2 is a general assembly view of the right side of the transfer mechanism, the drying machine and the receiving conveyor at the delivery end of the drying machine and this view, together with Fig. 1 when placed end to end, shows the complete apparatus of the present invention. So much of the tube forming machine is duplicated in Fig. 2 as will illustrate on one sheet of drawings the relation of the parts of the several machines and the control of the movements thereof from the tube forming machine. Also the drawing does not show that part of the drier intermediate its ends as this machine is of considerable length; furthermore, the enclosure for the drier is omitted, as it forms no particular part of the present invention.

Fig. 8 is a plan view of the front end of the machine showing the timing mechanism.

Fig. 9 is a detail view of the timing mechanism as it is seen in looking from the left side of the machine, that is from the left of Fig. 4 of the drawings.

Fig. 10 is an enlarged view of the left end of Fig. 9.

Fig. 11 is a side view of what is shown in Fig. 10.

Fig. 12 is a view similar to Fig. 10 but showing the timing mechanism released.

Fig. 13 is a view in reverse of the timing mechanism as shown in Fig. 9, that is looking from the right hand side of the machine.

Fig. 14 is a somewhat diagrammatic view of the complete tube forming machine looking from within the machine towards the left side and showing various parts in the position which they occupy after the web has been broken and just before the filled mandrel is removed from the machine.

Fig. 15 is a view similar to Fig. 14 but showing the parts in position to permit of the removal of the filled mandrel and the positioning of an empty mandrel at the winding point.

Fig. 16 is a view showing diagrammatically the general arrangement of the parts of the tube forming machine, and this figure shows the parts in their normal positions.

Fig. 17 is a part sectional view of the transfer chain mechanism looking from the center of the machine towards the right side and showing the means for engaging the chucks with and disengaging them from the mandrels.

Fig. 17a is a view, looking in the direction of the arrow 17a, Fig. 17, of one of the chuck disengaging devices.

Fig. 18 is a partial view of the left hand side of the discharge end of the transfer chain mechanism looking in the direction of the arrow 18, Fig. 17, that is to say looking from within the transfer mechanism towards the forward end.

Fig. 24 is a top plan view of what is shown in Fig. 21.

Fig. 25 is a front view of the upper portion of the right hand side of the delivery end of the drier and shows a portion of the mechanism for driving the drier carriers from their delivery ends and also the means for driving the receiving conveyor.

Fig. 26 is a perspective view of a clutch embodied in the structure shown in Fig. 25.

Figure 1:
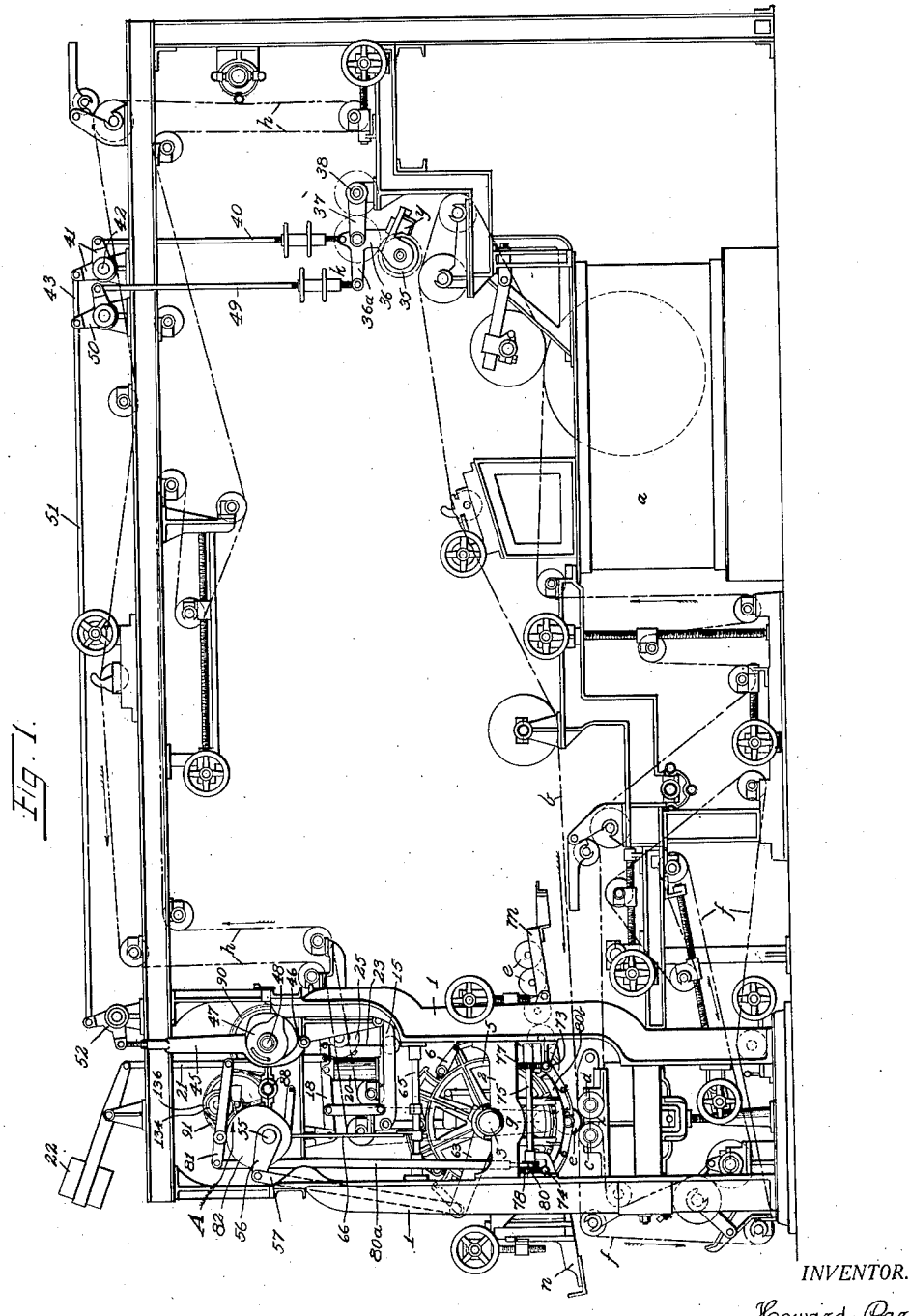

Figs. 27 and 31 show diagrammatically the manner in which the various operating parts of the transfer mechanism, the drier and the final receiving conveyor are electrically connected and originally controlled through these connections from the timing mechanism of the tube forming machine. These views successively show the order or sequence in which the various circuits are energized, those wires through which the current is passing being shown in full heavy lines and the dead circuits by light dot and dash lines.

Referring to the drawings, $a$ denotes a machine in which the pulp is formed into a web, the type of machine selected for illustration being what is known in the art as a cylinder machine, and from which the web of pulp is carried by an apron $b$ to the winding point of the tube forming machine. The type of web forming apparatus which may be used is immaterial. At the winding point or position of the machine indicated generally at $x$, there are one or more base rolls, two being here shown, $c$ and $d$, between which the mandrels $e$ rest, one at a time, while the pulp is being wound thereon. The apron $b$ which carries the web of pulp from the forming machine to the winding point returns back about the base roll $d$, the pulp being picked up off this apron by the mandrel. A second apron $f$ which is usually felt, preferably drier than the apron $b$, wraps around the base roll $c$ and carries away any excess of moisture which may be pressed from the pulp at this point during the winding operation. Pressure is brought to bear on the mandrel and the pulp thereon during the winding operation by the press roll $g$ and about this press roll is wrapped another apron $h$ which is relatively drier than the pulp at the point of contact and is adapted to carry away any moisture which is pressed out of the pulp during the winding operation. The directions of travel of the apron

*b* and the felts *f*, *h* are indicated by arrows. The apron *b* and the felts *f*, *h* are suitably driven so as to give rotary motion to the mandrel which lies between the base rolls *c*, *d* and the press roll *g*. As thus far described, it will be observed that a web of pulp which originates in the web forming machine is being continuously delivered to the winding point by the apron *b* and there wound upon the mandrel under the pressure of the roll *g*, and that excess moisture which is pressed out of the pulp as it is wound onto the mandrel is being taken away by two felts *f* and *h*. An important feature of forming a tube by winding is to produce a homogeneous wall which will not be liable to split during the drying and treating processes. One way to bring this about is to deliver the web of pulp to the winding point with an excess of moisture which will produce better union between successive convolutions.

At a point between the web forming machine and the winding position there is interposed a web breaking mechanism which will be described in detail hereinafter and which is for the purpose of breaking the web just before the winding is completed and removing the web from the apron for such a time as will be sufficient to permit of finishing the winding of the tube, and by this is meant sufficient time to wind up the tail end of the web after the break occurs, remove the filled mandrel from the winding position and carry in an empty mandrel to the winding position before the next succeeding forward end of the web on the apron *b* reaches the winding position. This web breaking mechanism is indicated generally at *k* and its operation and control is automatically governed from the winding point of the machine as will be hereinafter described.

It is, of course, necessary to raise the press roll *g* while a filled mandrel is being removed from the winding position and an empty mandrel is being positioned at the winding point. This press roll *g* is mounted in bearings carried by slides which are raised by suitable mechanism which will be hereinafter described. It will be seen that while all of the winding of the web of pulp onto the mandrel takes place at a single winding point or position, it is nevertheless true that as the thickness of the wall of pulp on the mandrel increases, the mandrel will rise and this necessitates providing means for permitting the press roll also to rise gradually during the winding. The press roll thus has two vertical motions, first the gradual rise due to the winding operation and second the abrupt rise to a material extent due to the lifting mechanism. In general, this operation of the breaking mechanism and of the lifting of the press roll is as described in my earlier application hereinabove identified, though differing therefrom in certain features which will be hereinafter pointed out. At the rear of the winding point is a mandrel feeding table *m* upon which empty mandrels are positioned and held in place by a stop which will be hereinafter described. Forwardly of the winding position of the machine is a mandrel receiving table *n* onto which the filled mandrels are delivered from the winding point and this receiving table *n* which may be in the form of tracks to support the ends of the mandrels, receives the filled mandrels as they are released from the mandrel carrier. The mandrel receiving table is slightly inclined downwardly and delivers the full mandrels to a position between a pair of chucks on a pair of transfer chains and these chucks are then moved into engagement with the mandrel by a rack controlled in its movements by what has taken place at the winding point of the tube forming machine. In the present illustrative disclosure, this control is brought about electrically and originates from the timing mechanism of the tube winding machine. Then the driving mechanism for the transfer chains is automatically set into operation to move it ahead one step, in other words carrying the full mandrel up and bringing into registering position opposite the receiving table a pair of empty chucks ready to be engaged with the next full mandrel which is delivered from the machine.

These transfer chains, there being two, one at each side of the machine, carry pairs of alined mandrel engaging chucks and travel upwardly from the receiving point, then across and down in front of the receiving end of the drier.

The drier has ten stages, each stage having a carrier provided with transversely extending rolls between pairs of which the tubes are adapted to be supported and these carriers slowly move through the drier with an intermittent or step by step movement so that when the tubes reach the delivery end of the drier they are suitably dried. There being ten stages in the drier, when the machine once is in operation ten tubes are delivered to the drier at the same time, one tube to each stage. At the receiving end of each stage of the drier there are certain receiving arms for taking the tubes from the transfer chains and delivering them to position upon the supporting rolls of the several carriers. As soon as a tube is made and delivered to the transfer chains, of course these chains are stepped forward and after a tenth tube has been finished and picked up and the chains have advanced one step, there is a tube positioned in front of each stage of the drier. After the tenth tube has been engaged with the transfer chain, the latter moves forward one step and during this movement properly timed mechanism controlled by what has previously taken place moves the receiving arms into position under each of the ten tubes as they are brought into position in front of the respective stages of the drier, the chucks are retracted, and then the arms are moved to carry the tubes located thereon onto the supporting rolls of the respective carriers, the carriers in the meantime having been operated to move the tubes supported thereon forward one step into the drier where they remain until ten more tubes have been made. Thus it will be seen that the time during which the tubes are periodically at rest in their travel through the drier corresponds to the time it takes to form ten tubes and deliver the last or tenth one to the transfer mechanism and start the latter forward one step. It will be apparent, owing to the fact that the receiving point of the transfer mechanism is positioned at a distance from the top stage of the drier, that there will always be a certain number of tubes between these points, in the present instance, there being three tubes on the lateral or top part of the transfer chains and ten tubes on the upwardly traveling portion of those chains. At the delivery end of the drier is a receiving conveyor having buckets arranged to receive a tube from each of the nine top stages of the drier every time the carriers move forward one step and then the receiving conveyor, through properly timed mechanism, is automatically set into operation to carry the tubes thereon down to a receiving platform. The lowest stage of the drier delivers directly to this platform.

Now, it will be observed that the complete actuation of the operation of the transfer mechanism (which includes the mechanism positioned at each stage of the drier and by which the tubes are shifted from the transfer chains to the supporting rolls), the drier carriers and the final receiving conveyor are all controlled in their movements primarily by what takes place at the winding point of the tube forming machine. In other words, if the tube forming machine is running and tubes are not being made, then the transfer mechanism, the drier mechanism in its step by step movement and the final receiving conveyor are not operating, but if tubes are being made at the winding point of the tube forming machine, as fast as a tube is finished and brought into position to be engaged by the transfer mechanism, this mechanism is released and caused to operate, and at proper intervals the drier supporting rolls are stepped forward and the final receiving conveyor is caused to operate. To go a step further, it will be seen that all of this control originates primarily from the circumstance that when the wall of the tube which is being wound reaches a predetermined thickness, the complete machine is unlocked and the released mechanisms function to produce a completely automatic handling of the tubes until they are delivered from the various stages of the drier.

Figure 4:
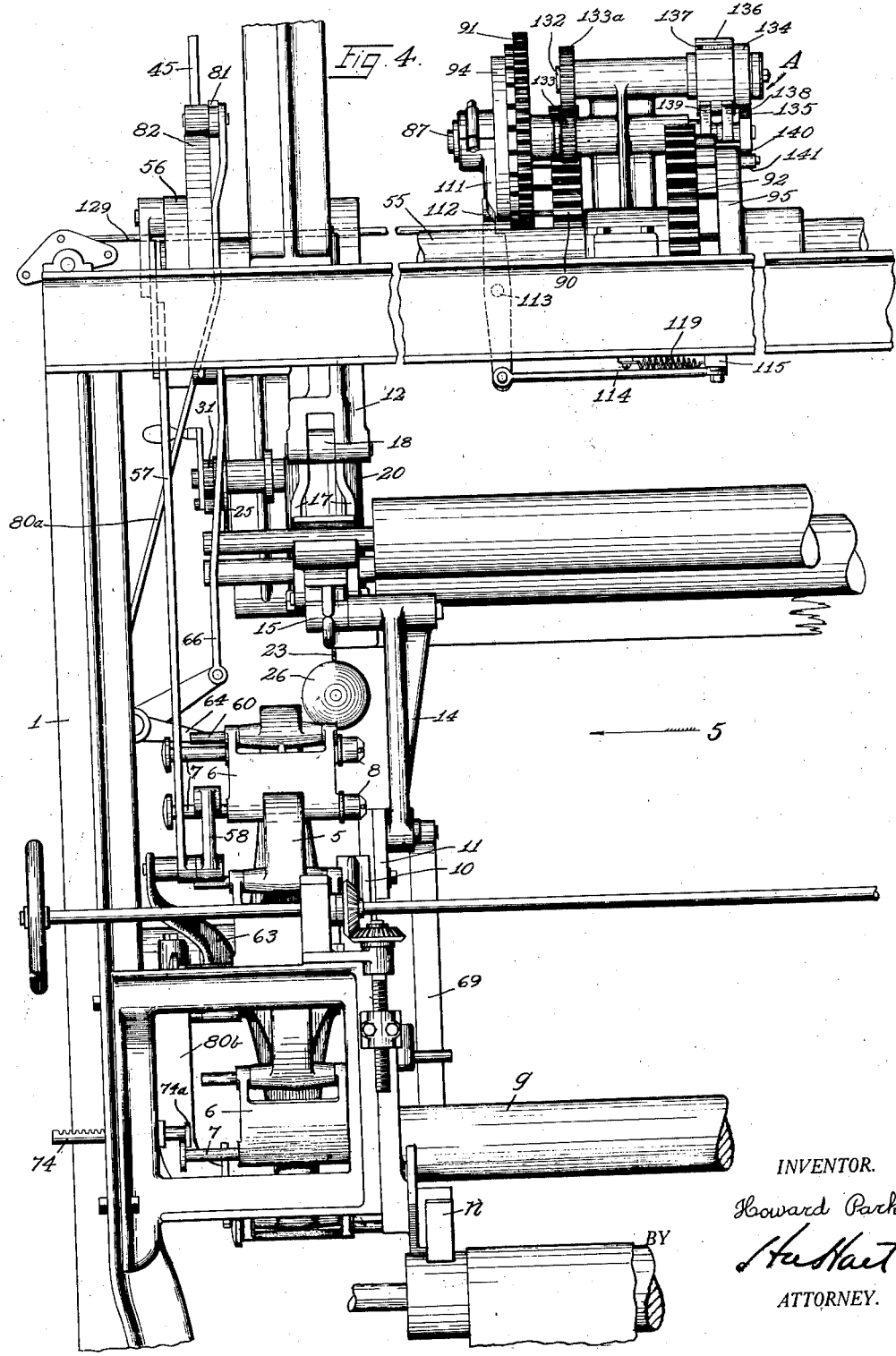
Fig. 4 is a front view of a portion of the left hand side of the tube forming machine shown in Fig. 1, corresponding mechanisms also being provided at the right side of the machine.

I will now proceed to describe the various details of construction of the winding machine proper, the transfer mechanism and the drying machine and the relation of these parts to one another. The frame of the machine in its main part comprises side uprights 1, 1, with transverse members 2, 2, which constitute the main bearings for short stub shafts 3, 3 on the inner ends of each of which there is mounted a carrier wheel 5. Each of these carrier wheels has secured to it a plurality of pivoted arms 6, Figs. 4 and 5, in the free ends of which are sliding chuck bars 7 carrying at their inner ends chucks 8. A chuck on one of the carrier wheels is in alinement with a corresponding chuck on the other carrier wheel and thus the carrier wheels are equipped with a plurality of pairs of alined chucks which are adapted to engage the ends of a mandrel and support it between them so that the mandrel is free to turn on the chucks, and has sufficient play to permit it to move as the pulp accumulates.

Inside of each of these carrier wheels and secured to the end of the stub shafts 3 are guide plates 10 provided with suitable ways within which move slides 11 between the lower ends of which the press roll $g$ is mounted in suitable bearings. The slides 11 are connected to the straps 12 of a pair of eccentrics 13 as follows: each slide 11 is connected by a link 14 to the free end of a frame 15 pivoted to the frame of the machine as at 16 and connected between its ends by a link 17 to and at a point between the ends of a floating lever 18 one end of which is connected to the arm of the eccentric strap 12. Connected to the other end of the lever 18 is a piston 19 working in a dash-pot 20 carried by the frame 15 at a point between its pivot 16 and its point of connection with the link 17. The floating lever 18 may be connected through a link 21 with a counterbalance weight 22. The end of one of the floating levers 18 extends beyond the piston 19 connected thereto and to this end is secured a cord 23 which is wrapped about a drum 24 of a rotatable disk 25, hereinafter referred to as a thickness adjuster. The cord 23 carries at its end a weight 26. Within the dash-pot 20 there may be a liquid such as oil and the piston 19 may have small passages so that the oil may flow slowly from one side of the piston to the other. It will be observed and it is clearly shown in Fig. 14 that as the winding of the tube proceeds the press roll $g$ rises, and through the link 14 rocks the swinging frame 15 on its pivot 16, which through the link 17 forces up that end of the lever 18 to which the cord 23 is attached, the other end of this lever being at this time held and practically fulcrumed on the end of the arm of the eccentric strap 12. As the lever 18 is thus raised obviously the cord 23 attached thereto and wound about the drum of the thickness adjuster 25 will cause that thickness adjuster to turn. On this thickness adjuster is a trip finger 27. The thickness adjuster may be rotatably adjusted by the gearing 31 (Fig. 4) in order to so position this trip finger at the time when the winding commences that when a proper thickness of tube wall has been secured this trip finger will have arrived at the point to engage a dog 28 (Fig. 16) and thus operate the tripping lever 29 carrying the dog and mounted on a shaft 30 and by means of which the timing mechanism which will be hereinafter described is set into operation to start other parts of the machine functioning. The dog 28 is so arranged on the lever 29 that the lever 29 is only operated when the finger 27 moves beneath the dog in the direction of the arrow Fig. 5.

I will first briefly describe the mechanisms which are operated by the timing train and the order of their operation so far as the tube machine is concerned.

The first thing that is necessary to do after a proper thickness of tube wall has been reached is to break the web as it comes from the web forming machine and lies upon the apron b. This web breaking mechanism which is indicated generally at k, see Figs. 1, 14, 15 and 16, comprises a roll 35 extending across the web and carried by a pair of hangers 36 which are pivoted in brackets 37 which brackets have a slight rocking motion in bearings 38 on the frame.

The hangers 36, which form a pivoted carrier for the breaker roll, are raised and lowered through links 40 connected to bell crank levers 41 fixed to a shaft 42 and connected by a rod 43 to one arm of a bell crank lever 44 loose on a shaft, the other arm of this lever 44 having connected to it a vertically movable bar 45 carrying at its lower end a roller 46 cooperating with a cam 47 fixed on the shaft 48. Similarly, the hangers 36 are turned about their pivots in the brackets 37 through links 49 connected to laterally extending arms 36ª of the hangers, levers 50, rod 51, bell crank 52, and a second vertically movable bar 45 cooperating with its cam 47 also fixed on the shaft 48. The cams 47 are adjustable to permit of changing the time of release of the breaker roll. Shaft 48, on which the breaker roll operating cams 47, 47 are mounted, is the first shaft which moves when the machine is tripped by the thickness adjuster 25, and consequently the dropping of the breaker roll onto the web b is the first result of tripping. Of course, it will be understood that after the breaker roll is dropped it remains in that position for a time and continues to pick up the web which may be removed from its surface in any well known way as by a doctor, indicated generally at y, and during the time the roll is down and picking off the web of pulp from the apron, thereby forming a decided gap in the web, certain other mechanisms in the machine are being operated as follows.

First, the winding continues until the tail end of the sheet has been wound up onto the mandrel under pressure and, as the expression is, "finished off". When the tail end has been wound up and finished off, the timing gears operate the shaft 55 and the eccentrics 13, 13 acting through the levers 18 and links 17 quickly raise the press roll by rocking the swinging frames 15 on their fulcrums 16 into the position shown in Fig. 15 of the drawings. As the shaft 55 turns it carries with it an arm 56 which is fast thereon and lowers a link 57 to the end of which is pivoted a dog 58 (see Figs. 4, 5 and 6). This dog is carried to its lowermost position, shown in dotted lines in Fig. 6 and there is forced by the spring 59 to engage one of the pins 60 by which the arms 6 are pivoted to the carrier wheel. The pivotal movement of the dog 58 is limited by a projection 61 positioned in a notch 62 in the hub of the dog, as shown most clearly by dotted lines Fig. 6. The lower end of the link 57 is guided in its movements by an arm 63 journalled on the stub shaft 3. As the shaft 55 continues to turn, the link 57 will be raised and the dog 58 will turn the carrier wheel forward. The dotted line showing of link 57 and dog 58 show the extreme travel, and the full lines show usual position of rest. There is similar mechanism at the other side of the machine so that each of the carrier wheels is engaged by similar dogs 58 and operated together. After the carrier wheels have completed their forward movement, the dogs 58 are disengaged from the pins 60 by the positioning fingers 64 fixed to a shaft 65 which is turned through the action of the link 66 operated by the roller 67 in the cam groove 68. When these fingers are raised they knock off the dogs 58 and stand between two of the pins 60 to hold the carrier wheels in the new position.

Figure 5:
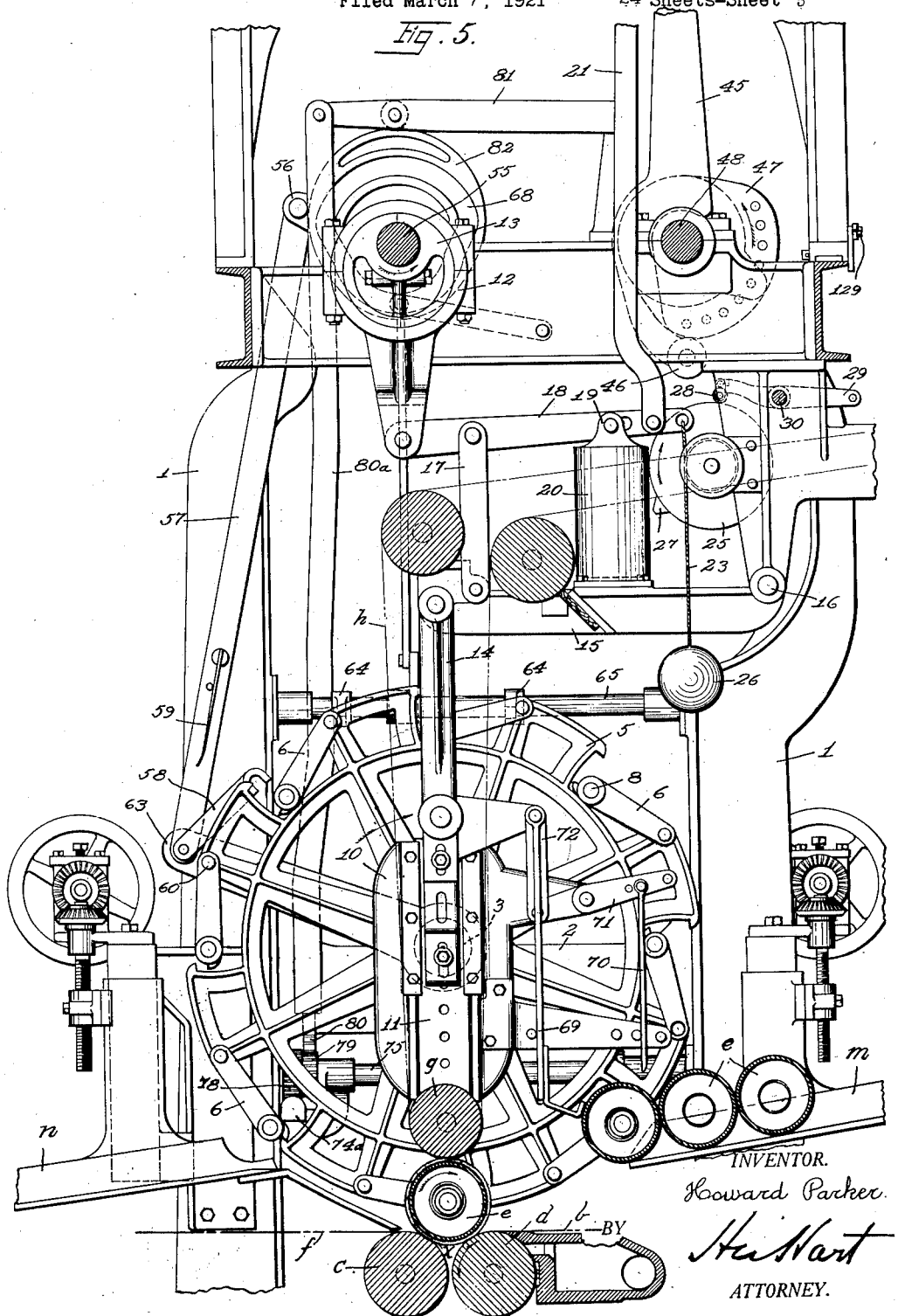
Fig. 5 is a part sectional view of one end of the winding portion of the machine looking in the direction of the arrow 5 on Fig. 4, that is to say, looking from the center of the machine towards the left side.
Figure 6:
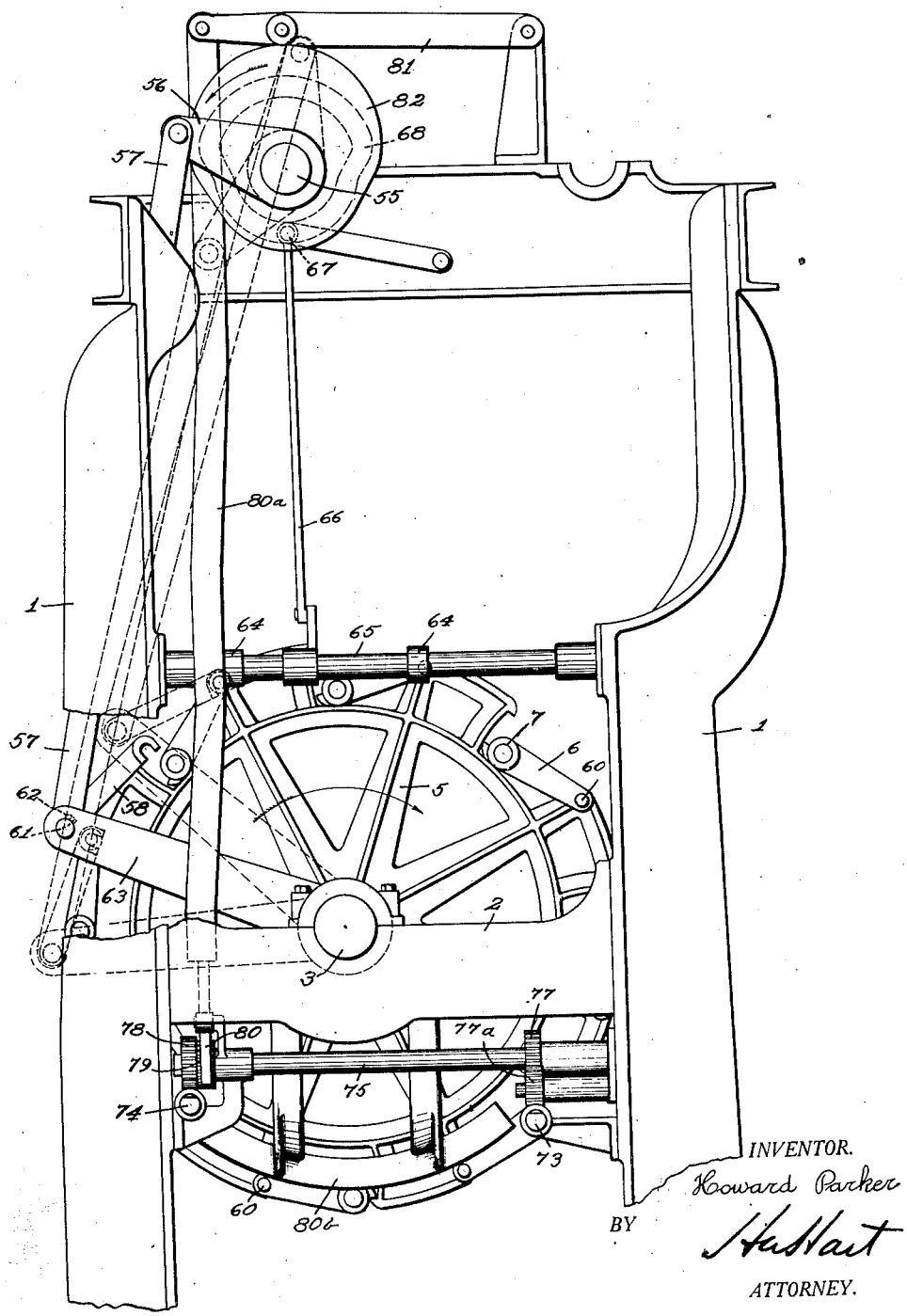
Fig. 6 is an outside view of a part of the right hand side of the machine, a portion of the frame being broken away to show in detail the means for operating the mandrel carrying wheels, similar mechanism also being arranged at the left hand side of the machine.

By reference to Fig. 14 which shows the winding just about completed, it is to be understood that the front mandrel on the feeding table m and which rests against the stops 69 has been engaged with a pair of chucks on the carrier wheels as will now be described, and as the press roll is lifted as shown in Fig. 15 it will be seen that the stops 69 are withdrawn permitting that forward mandrel to be fed forward by the carrier wheels into winding position while the full mandrel is carried out to be delivered to the receiving table n and the next mandrel on the feeding table is held back by the stop arms 70 connected to the slides 11 by levers 71 and links 72. When the parts have resumed their normal position as shown in Fig. 5 with the press roll resting on the empty mandrel, the full mandrel is to be disengaged from its chucks, and a new mandrel *e* is released by the stop arms 70 and rolls down against the stops 69 in a position to be engaged by the pair of chucks.

Figure 7:
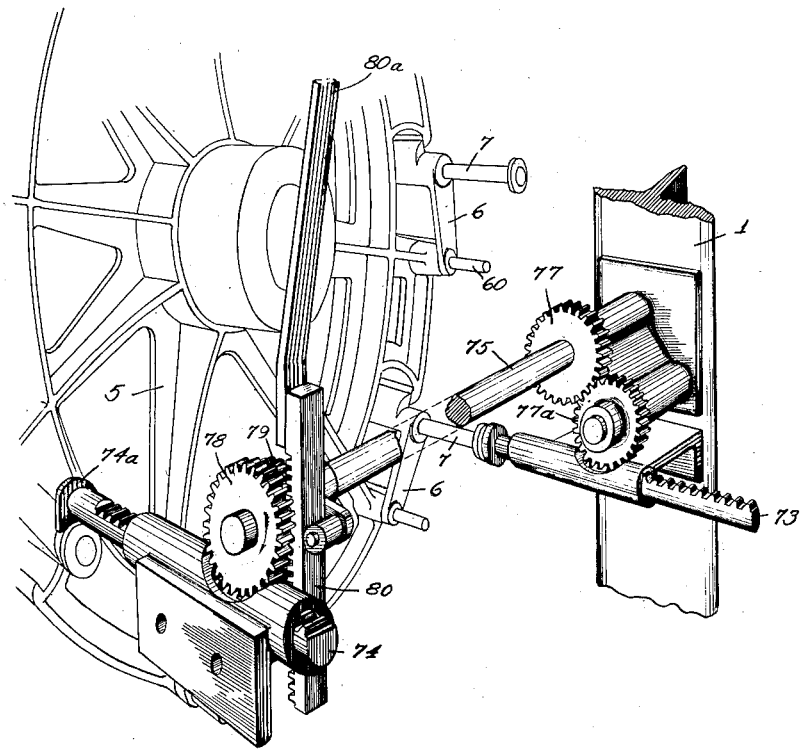
Fig. 7 is an outside view, in perspective, of a part of the right hand side of the machine and shows, in detail, the means for operating the mandrel holding chucks.

The manner in which chucks are engaged with and disengaged from mandrels will now be described. Positioned at the outside of each carrier wheel are a pair of plungers 73, 74 for respectively engaging and disengaging the chucks with and from the mandrels and the manner in which these plungers are operated will be clearly understood from Figs. 6 and 7. The plungers are formed at their upper sides as racks, as clearly seen in Fig. 7, and extending along the outside of each carrier wheel is a shaft 75, its rear end being connected with plunger 73 through gears 77, 77ª and its front end with plunger 74 through gear 78. Shaft 75 also carries a pinion 79 meshed with a vertically moving rack 80 connected through link 80ª with a lever 81 having a roller riding on the cam 82 on the shaft 55. As the shaft 55 turns, and while the dogs 58 are bringing the carrier wheels into a new position, the rack 80 moves down rotating the shaft 75 in the direction indicated to withdraw the plunger 73 to the position shown in Fig. 7 advancing the plunger 74 so that the head of the chuck bar 7, carrying the full mandrel from the winding point to the receiving table *n*, will lie behind the head 74ª of the plunger 74 when the wheels 5 are brought to rest. During the completion of the revolution of the shaft 55, the rack 80 will be raised causing the plungers 73 to move inwardly moving the chuck bars 7 to engage the chucks with an empty mandrel, and the plunger 74 will be withdrawn to pull out and thus disengage the chucks holding the full mandrels. Just outside of the path of travel of the heads of the chuck bars 7 and between the supply and discharge points of the wheels is a fixed guard 80ᵇ for preventing accidental withdrawal of the chucks from the mandrel supported thereby during the winding operation. In the meantime, the neutral parts of the cams 47 which have been in such position that the breaker roll has been down, have been passed and the breaker roll has been raised by the cams 47 with the result that a new end of pulp is coming up to the winding point as indicated by the heavy line on top of the apron *b* in Fig. 15. The breaker roll may be driven by the train of gears 54 or in any suitable manner, and preferably at the same speed as the apron when in contact therewith. With the arrangement shown, upon operation of the cams 47, the breaker roll, as it is raised, is pulled slightly forward, that is in the direction of movement of the web, and also it will be seen that the movement of the roll will be accelerated when moving out of contact with the web, these being important features for the purpose of tearing the sheet and making a clean break so that an even square end of the pulp is presented to the empty mandrel when it is in winding position.

The swinging frames 15 are lowered to resume their normal position by eccentric 13 as shown in Fig. 16 and all parts are now in position to carry on the winding of a new tube on the new mandrel.

The timing mechanism by which the hereinabove described and other movements of the tube forming machine and also of the transfer mechanism and the drying machine are controlled, is illustrated in Figs. 4 and 8 to 13 inclusive. It should be remembered that Figs. 9, 10 and 12 are views looking from the left hand side of the machine, in other words, from the left of Fig. 4 and from the opposite side of the machine as shown in Fig. 1. Shaft 48 as seen in these figures is the shaft upon which the breaker-roll-cams 47 are mounted (see Figs. 1, 5 and 16). 87 is an intermediate shaft and 55 is the shaft upon which the eccentrics 13, the crank arms 56, and the cams 82 with the cam groove 68 in them are mounted. Loose on these shafts 48, 87 and 55 and driven from shaft 88 are gears 90, 91 and 92 respectively. Fast on these shafts are clutch drums 93, 94 and 95 each closely associated with its cooperating gear. Each clutch drum is equipped with a radially spring pressed pawl 96 (Figs. 10 and 11) having a portion which is adapted to engage in notches 97 in the gears and a projection 98 which cooperates with a cam such as 99 to retract the pawl or force it back into its pocket in the clutch drum and disengage it from the gear. It will be understood that on each of the shafts 48, 87 and 55 there is a like clutch associated with the gear on that shaft and a like cam for disengaging the clutch drum pawl from the gear.

Referring now to Figs. 9 and 10, the parts of this timing mechanism will be seen in the position which they occupy while they are inactive, which means while a tube is being wound. It will be seen that the cam 99 is holding its associated pawl 96 retracted and consequently the clutch drum is disconnected from the constantly rotating gear 90. This cam 99 is held up by the pivotally mounted latch 100 which is weighted at one end. 30 is the shaft to which is secured the tripping lever 29 which is actuated by the tripping finger 27 on the thickness adjuster 25.

When the thickness of the tube wall has been built up to a predetermined thickness, the tripping finger actuates the tripping lever to rock the shaft 30 to which is secured a finger 104, and this finger engages and raises a dog 105, pivoted on the latch 100, into the path of the teeth of the continuously rotating gear 90. A gear tooth striking this dog rocks the latch 100 to the left as seen in Figs. 9, 10 and 12 and into the position shown in Fig. 12. The cam 99 is now free to drop by its own weight, the pawl 96 is released and immediately moves forward to engage with the notch in the gear.

The clutch drum 93 and the shaft 48 on which it is mounted immediately begin to rotate with the gear 90. The rotation of this shaft 48, of course, operates the cams 47 in the direction of the arrow, Fig. 16, to drop the breaker roll onto the apron, where the roll stays during the low neutral part of the cam. When the gear 90 and the clutch drum 93 have almost completed one revolution a projection 106 on the face of the clutch drum 93 engages the cam 107 which is pivoted as at 108. This cam being displaced, releases the pawl 110 of the clutch drum 94 which jumps forward and engages with the gear 91 driving the shaft 87 and the arm 111 carried thereby. Just before gear 91 and its clutch drum 94 have completed a revolution the arm 111 rides under the end of the lever 112 which is pivoted as at 113 and is connected by the link 114 with the cam 115 pivoted as at 116. See Fig. 13. This motion throws the cam 115 out of position and releases the pawl 117 of the clutch drum 95 so that it jumps forward and connects with the gear 92 thus causing the rotation of the shaft 55 and the operation of the eccentrics 13, the crank arms 56 and the cams 82, all for the purpose hereinbefore described, namely, first to raise the press roll, then to feed the carrier wheels 5 forward, then to position and lock the carrier wheels in place and, finally, to retract a pair of chucks from a full mandrel and engage a pair of chucks with an empty mandrel.

As soon as the cams 107 and 115 are moved to release the pawls so that they may engage with their gears and those pawls have moved on, these cams are returned to normal position by springs 118 and 119. Just before the gear 90 and its connected clutch drum have completed their rotation, the projection 98 of the pawl 96 strikes a plate 122 connected to a segmental gear 123 which meshes with another segmental gear 124 pivoted as at 125 and connected with the cam 99 as by the pin 126, raising the cam 99 until the weighted latch 100 engages therewith, all as shown in Figs. 9 and 10. As the gear 91 and its associated clutch drum 94 complete their revolution, the cam 107 disengages the pawl 110 from the gear and stops the clutch drum, and the same is true of the cam 115 disengaging the pawl 117 and releasing the gear 92 from its clutch drum 95.. This brings all the parts to rest, at which time a new mandrel is positioned between the base rolls and the press roll and the winding of a new tube starts. When it is desired to throw the machine out of operation without throwing off the power, the cam 128 may be manually moved by the rod 129 into position to disengage the pawl 96 from the gear 90.

As has hereinbefore been explained, the movements of the transfer mechanism and its associated parts by means of which the green tubes are taken from the tube forming machine and carried over to and deposited upon the supporting rolls of the drier, the movement of the mechanisms within the drier and upon which the tubes are carried therethrough and the movements of the receiving conveyor positioned at the delivery end of the drier are all controlled primarily from what has occurred at the winding point of the tube machine. In the embodiment of the invention here selected for illustration, this control is effected through suitable electrical circuits which are governed by instrumentalities positioned at and connected with the timing mechanism of the tube forming machine. By reference to Figs. 8, 12 and 13, it will be seen that above the intermediate shaft 87 is positioned an auxiliary shaft 132 driven therefrom through the gears 133, 133ª. Mounted upon this shaft so as to be frictionally driven therewith is a sleeve 134 which is normally held against rotation by a pivoted pawl 135. On the sleeve is mounted a ring 136 rotarily adjustable thereabout and carrying a circuit closing strip 137 which cooperates with a pair of contact fingers 138, 139 which constitute the terminals of an electrical circuit. The pawl is normally held in any desired manner in position to engage the ring 136 to hold it against rotation, but it is equipped with a tail piece 140 which lies in the path of movement of a pin 141 properly positioned on the clutch drum 95. It will be apparent that as the winding of a tube is completed and the timing mechanism set into motion by the release of the cam 99 so as to cause the breaking of the web, the raising of the press roll, removal of the completed tube and the bringing into position of the empty mandrel, the rotation of the clutch drum 95 with its gear 92 will bring the pin 141 into contact with the tail piece 140 of the pawl 135 disengaging the pawl from the sleeve 134 permitting it to be driven frictionally with the shaft 132 with the result that the contact strip 137 will be carried around to close the circuit between the fingers 138, 139. This contact strip and the fingers will be hereinafter referred to as the switch A. It will now be apparent that by adjusting the ring 136 about the sleeve 134, the time of closing the circuit can be varied to bring about the closing of the switch and the actuation of the devices controlled thereby at the proper time.

Figure 22:
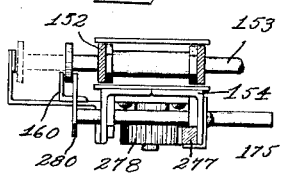
Fig. 22 is a horizontal sectional view taken substantially on line 22—22 of Fig. 21.
Figure 23:
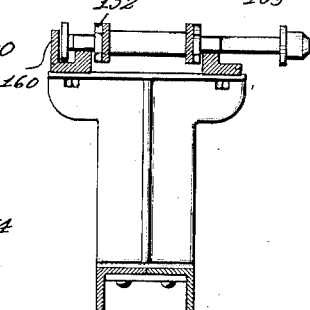
Fig. 23 is a vertical section through the upper or lateral run of one of the transfer chains, this view being taken substantially on line 23—23 of Fig. 21.

The transfer mechanism has a pair of chains 152 (Figs. 21 and 24), one at each side of the machine, carrying alined mandrel holding chuck bars 153 similar in construction to the chuck bars 7 of the carrier wheels 5. These chains pass about frames 154, are driven in unison by sprocket wheels 155 fixed on a shaft 156 (see Fig. 2) and travel, as previously stated, upwardly from the receiving point, that is from the position at which the full mandrels are delivered to the receiving table $n$, then laterally across the top of the frames and then down in front of the receiving end of the drier. Between the points at which the chuck bars 153 are engaged with and disengaged from the mandrels, the frames 154 are provided with guards 160 for preventing accidental withdrawal of the chucks (see Figs. 21 to 23). After a full mandrel has been delivered from the tube forming machine and rolls down the receiving table $n$ to position between a pair of chucks 153, the switch A, associated with the original timing mechanism, operates to close a circuit through a solenoid B (see Figs. 17-18) the armature of which thereupon moves upwardly swinging a pawl 158 connected thereto in a direction to release a weighted cam 159 associated with a clutch C similar to the clutches embodied in the timing mechanism of the tube forming machine. When this cam drops, the clutch drum 162 fixed to a shaft 163 is engaged with its cooperating sprocket gear 164 driven continuously through a chain 165. On each end of this shaft 163—there being like mechanisms for each chain for engaging the mandrels therewith—is a fixed pinion 166 meshing with a like pinion 167 on an auxiliary shaft 168 carrying at its inner end a crank 169 to which is connected a link 172 secured at its lower end to a rack 173 meshing with a pinion 174 which in turn meshes with the teeth of a plunger 175 located adjacent the forward end of the receiving table $n$. The rack 173, the pinion 174 and plunger 175 are similar in construction and operation to the means heretofore described for engaging the chucks of the carrier wheels 5 with the empty mandrels. By this engagement of clutch C, the cranks 169 are turned one complete revolution, causing the plungers 175 to move inwardly pushing the chucks forward to engage them with a full mandrel, and then withdraw to normal position. When the shaft 163 has almost completed one revolution, the clutch dog 176 of the clutch C engages lever 177 to rock the cam 159 up into position to retract the dog 176 and disengage the parts of the clutch C, and the parts then assume their normal positions as shown in Fig. 17, clutch drum 162 coming to rest.

Figure 19:
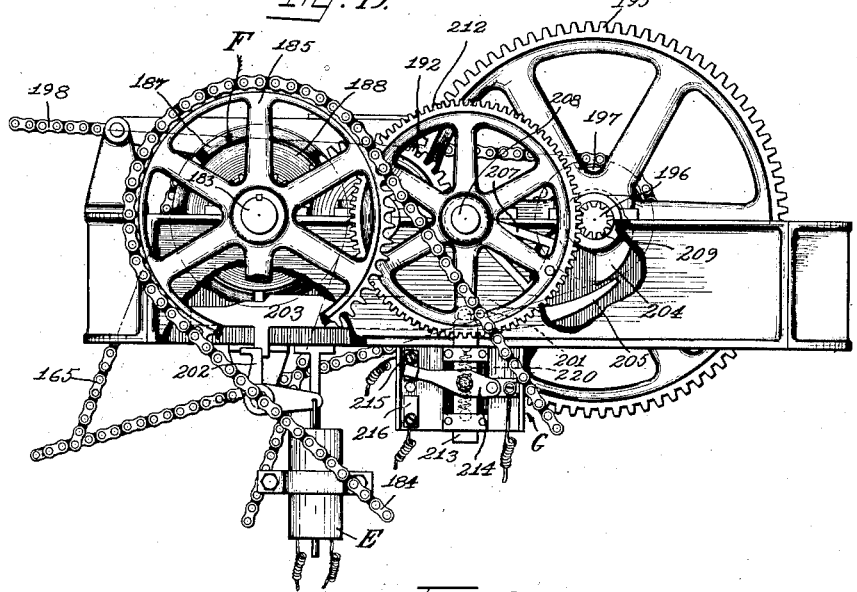
Fig. 19 is a view of the mechanism for moving the transfer chains as it is seen in looking from the right side of the machine.
Figure 20:
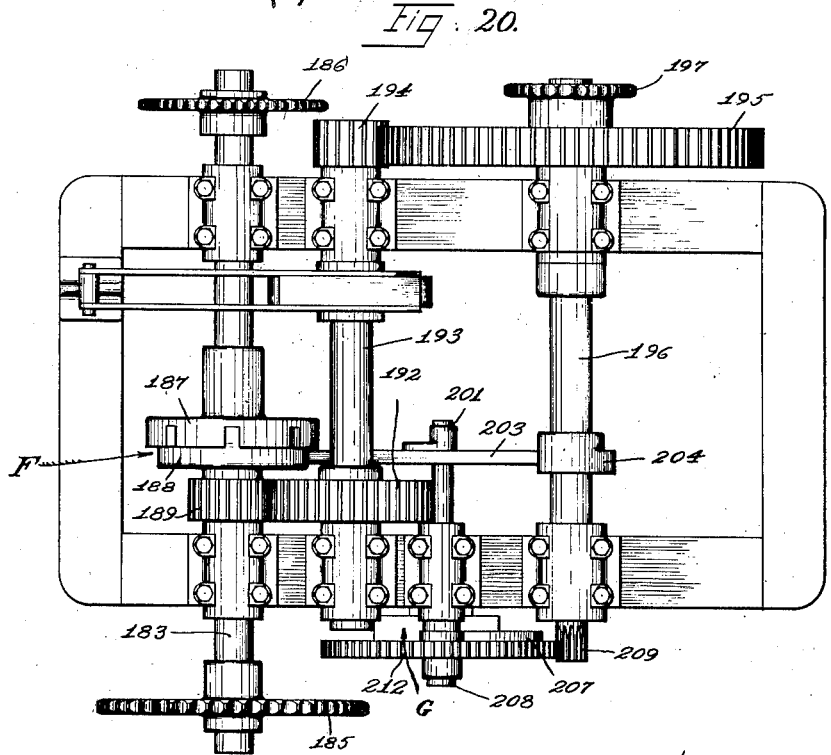
Fig. 20 is a top plan view of what is shown in Fig. 19.

After the chucks are thus engaged with the full mandrel the transfer chains are automatically stepped forward one step and this is brought about through the closing of a switch D which comprises a circuit closer 178 rotatable with the shaft 163, cooperating with a pair of terminals 179 to close a circuit which momentarily energizes a solenoid E to engage the members of clutch F of the driving mechanism, shown in detail in Figs. 19 and 20 and which will now be described. Referring to these figures, 183 is a shaft constantly driven in any suitable manner, as by a chain 184, passing about a sprocket 185 fixed to one end of this shaft. On the other end of the shaft is a sprocket wheel 186 receiving the chain 165. Also on the shaft 183 is a clutch F having a fixed drum 187, and a loose drum 188 to the hub of which is fixed a pinion 189 connected through gear 192, shaft 193, pinion 194 and gear 195 with a shaft 196 to one end of which is fixed a sprocket wheel 197 connected by a chain 198 to a sprocket 199 (see Fig. 2) fixed on the shaft 156 on which, as previously stated, the driving sprockets 155 for the transfer chains are mounted. When the solenoid E is energized, its armature rises and releases a pawl 202 from the cam 203 pivoted at 201 and which thereupon drops permitting engagement of the clutch F and rotation of the shaft 196 which through the chain 198 drives the sprocket wheels 155. The shaft 196 carries a cam 204 which engages the tail end 205 of the cam 203 to return the latter to the normal position shown in Fig. 19 and thus disengage the clutch F.

So much of the transfer mechanism as has been described operates each time a finished tube is delivered from the tube forming machine, that is to say each time a finished tube is delivered to the receiving table $n$ a pair of chucks 153 on the chains 152 are engaged with that tube and then the chains are moved forwardly one step to raise the engaged mandrel and bring another pair of empty chucks into position ready to pick up a new tube when it is finished and rolls down the table $n$.

After the tenth tube has been engaged with the transfer chains and these transfer chains start to move, there is a tube being brought into position in front of the receiving end of each stage of the drier. At that time a segment 207, which is fixed to a stub shaft 208 driven from the shaft 196 through the pinion 209 and gear 212, engages a slide 213 to which is connected a pivoted contact arm 214 of a switch G and thus this arm is moved from the upper contact plate 215 into engagement with the lower one 216, closing a circuit which energizes a solenoid H and thereby sets into operation certain mechanism for throwing the receiving arms 219 at the forward end of each stage of the drier out beneath the now descending tubes on the transfer chains. The contact arm 214 is normally held in engagement with the upper stationary contact 215 by a spring 220.

Figure 2:
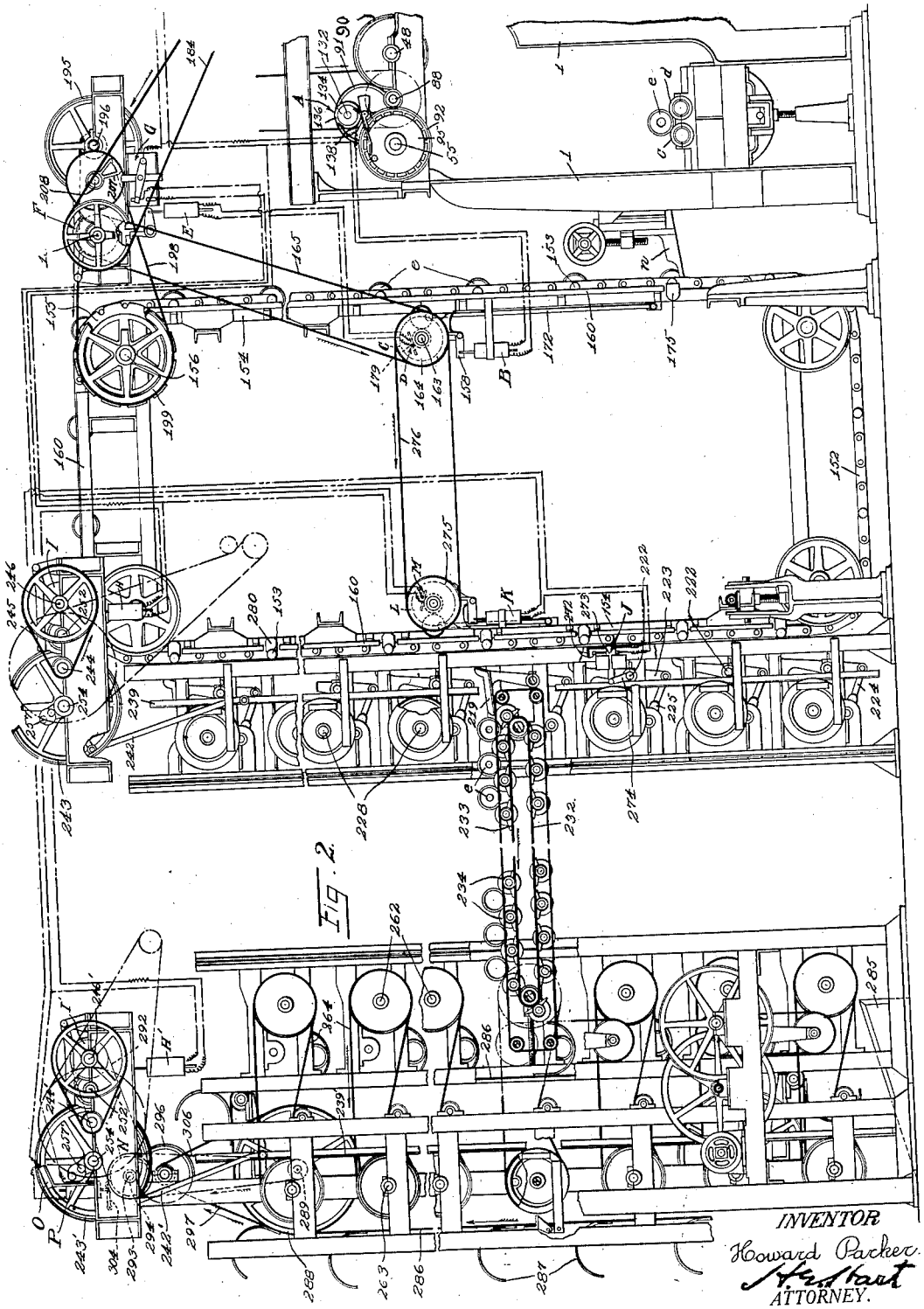
Figure 3:
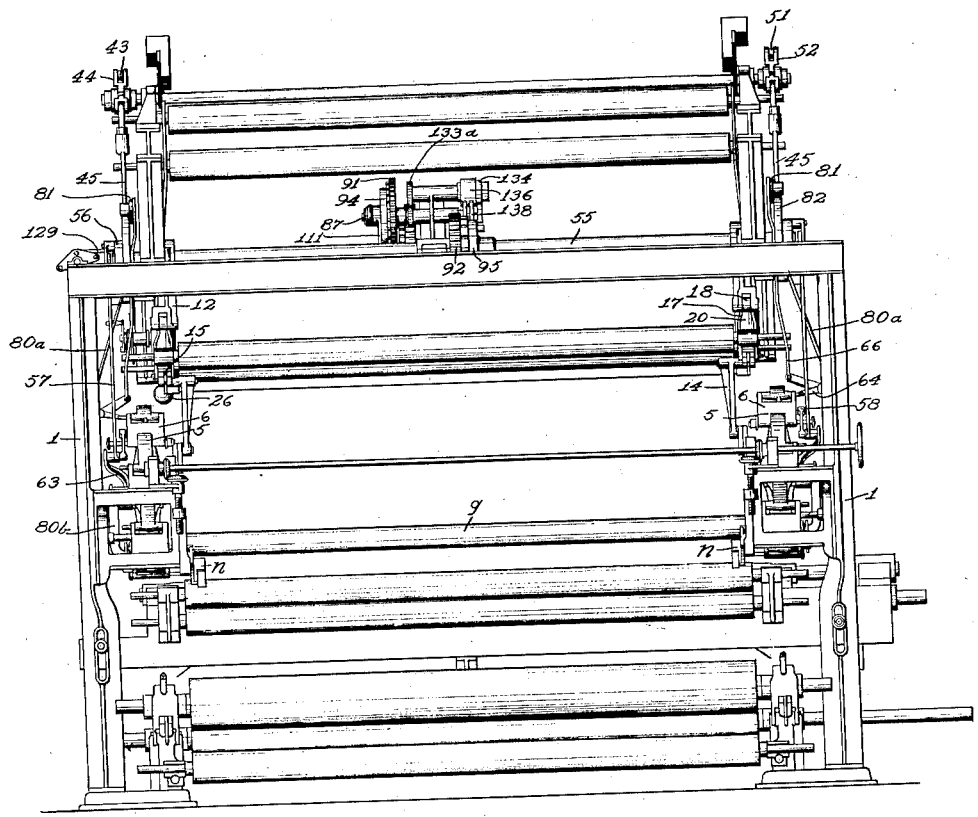
Fig. 3 is a front view of the tube forming machine shown in Fig. 1.
Figure 21:
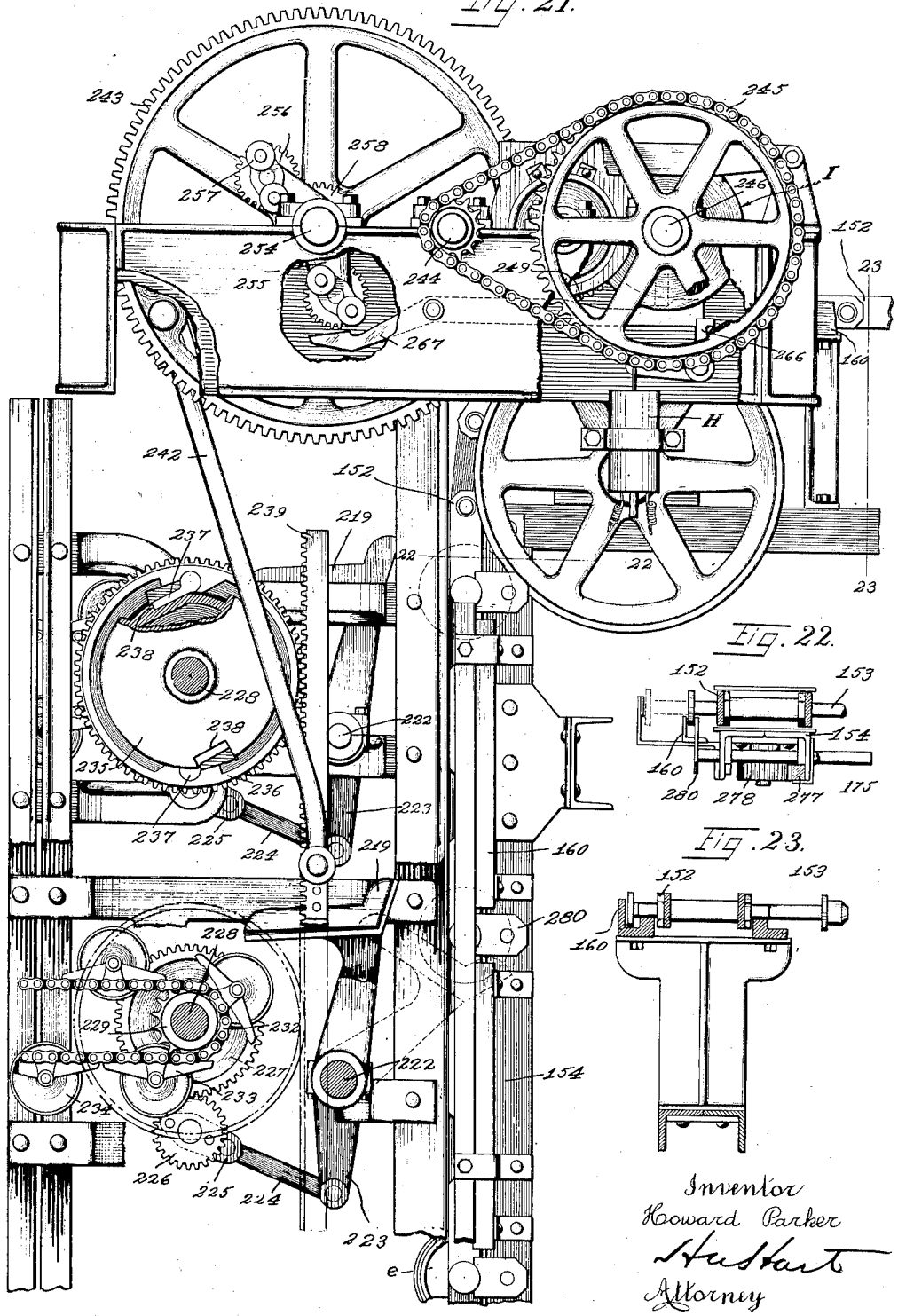
Fig. 21 is an outside view with parts broken away, looking towards the right hand side of the machine, of a portion of the forward or discharge end of the transfer mechanism and the adjacent or receiving end of the drier.

Referring particularly to Figs. 21 and 24 it will be seen that at the forward end of each stage of the drier is a rock shaft 222 carrying a pair of receiving arms 219 and also at one end a crank 223 connected by a link 224 with a crank 225 fixed to a gear 226. The gear 226 meshes with a gear 227 twice its size. The gear 227 is fixed to one end of shaft 228 carrying a pair of spaced sprockets 229 about which pass the carrier chains 232. Connected to the links of these carrier chains are suitable bearing members 233 for the rollers 234 on which the tubes to be dried are supported. On the other end of each shaft 228 is a ratchet clutch having a drum 235 fixed to the shaft, and an encircling gear 236. This gear carries spring pressed pawls 237 which engage teeth 238 on the drum 235 and cause the latter to rotate when the gear is rotated in a counter clockwise direction referring to Fig. 21. Meshing with all of the gears 236 is a common rack 239 connected by a link or pitman 242 to a large gear 243. This gear 243 is driven from a main shaft 244 (see Fig. 24) through a chain 245, and shaft 246 carrying a clutch I to the loose drum member 247 of which is fixed a pinion 248 meshing with a gear 249 fixed to an intermediate shaft 252 to which is also fixed a pinion 253 meshing with the gear 243. Carried by the shaft 254 on which the gear 243 is fixed is a bracket 255 having a pair of arms in each of which is journalled a stud carrying at one end a gear 256 and at its other end a pair of eccentrically positioned rollers 257. The gears 256 mesh with a gear 258 encircling the shaft 254 but fixed to the frame or bearing in which this shaft is mounted so that this arrangement is in the nature of a planetary gearing. Each of the carriers of the drier, owing to the fact that they are of considerable length and, therefore, quite heavy, are simultaneously driven at both ends preferably by similar mechanisms. At the delivery end of the conveyor (see Fig. 2), instead of mounting the ratchet clutches on the shafts 262 about which the carrier chains pass, these ratchet clutches are carried by auxiliary shafts 263 connected by chains 264 to the shafts 262. The means for reciprocating the common rack 239' at the delivery ends of the carriers is identical to and operate simultaneously with the means for reciprocating the like rack 239 at the receiving ends and therefore, the parts thereof are designated by like characters except that they are primed. Now, as shown in Fig. 28, when the segment 207 throws the contact arm 214 into engagement with the lower contact 216, and which occurs as stated after the tenth tube has been engaged with the transfer chains and these chains have started to move, the solenoid H is energized (also the solenoid H') actuating the pawl 266 to release the cam 267 and throw the clutch drum 247 in and cause the gear 243 to rotate. While this gear is rotating through an angle which brings the upper end of the pitman 242 from the position shown in Fig. 21 to its lowermost position, the rack 239 will be lowered and the gears 236 meshing therewith will be rotated in a clockwise manner without rotating the drums 235. As the gear continues to rotate through approximately the next 90°, it raises the rack 239 which through the ratchet clutches rotates each shaft 228 through about one-fourth of a turn and due to the ratio of the meshing gears 227 and 226 the latter will be rotated 180° throwing the receiving arms 219 out into the dotted line position Fig. 21 below the descending tubes. While the shaft 228 is thus rotated, the carrier chains will of course be moved forward a part of one step since the carrier chain sprockets 229 are fixed to this shaft. When the gear 243 has made about a third of a revolution, that is when the upper end of the pitman 242 has been brought to the position shown in Fig. 30 one of the pins 257 of the planetary gearing engages the tail end of the pivoted lever 267 throwing the same upwardly and disconnecting the clutch I whereupon the parts will come to rest with the arms in the position shown in Fig. 30 and in dotted lines Fig. 21. In the meantime, the transfer chains are continuing to move to bring each of the ten finished tubes on the delivery side of these chains into position on the now outwardly positioned receiving arms and as these chains approach the completion of their step, (i. e. just before the cam 204 strikes the cam 203 of the clutch F) the head of one of the chuck bars 153 engages the contact members 272 of a switch J, Fig. 17. These contact members, as shown in Fig. 2, are carried by a slide 273 connected by a crank 274 with one of the shafts 222 so that when the receiving arms are thrown out into dotted lines position Fig. 21 the switch J is moved into position directly under the descending chuck head. The result of closing the switch J is to energize a solenoid K and thereby engage a clutch L of a mechanism which is identical in construction and operation to the heretofore described mechanism for operating the chuck engaging means at the receiving side of the transfer chains. The gear or sprocket 275 of clutch L is driven from the sprocket 164 by a chain 276. After the chuck L is engaged the rack 277 is lowered and through the pinions 278 moves the plungers 279 outwardly from the position shown in Fig. 18 to withdraw the chucks from the mandrels which are now positioned on the receiving arms. There are of course ten pairs of plungers 279 all operated by the rack 277. These plungers are similar to the plungers 74 for retracting the chucks of the carrier wheels 5 and have heads 280 which engage behind the heads of the chuck bars 153, as shown in Figs. 18 and 21. As the mechanism of which the clutch L is a part continues to operate, a switch M associated therewith and similar to the switch D, is closed causing the current to again energize the solenoid H (also solenoid H') whereupon the clutch I is again engaged and the gear 243 completes its revolution. As the gear moves the pitman 242 from the position shown in Fig. 30 to that shown in Fig. 31 the rack 239 is raised to complete the step movement of the drier carriers and throw the receiving arms forwardly to deliver the tubes supported thereon onto the pairs of supporting rollers of the carriers which have just been brought into position to receive the same. As the gear approaches the end of its revolution the rack 239 is lowered into normal position and one of the studs of the planetary gearing again engages and raises the cam 267 to throw the clutch out of engagement so that the parts are now brought to their normal positions.

Every time ten green tubes go into the receiving end of the drier ten dry tubes come out from the delivery end of the drier, one from each stage. The receiving conveyor which receives dry tubes from the first nine stages of the drier and carries them down to the receiving platform 285 (see Figs. 2 and 31) consists of a pair of chains 286 provided with brackets 287 and passing at their upper ends about a driven sprocket 288. The lowest carrier of the drier delivers direct to the platform 285. The shaft 289 on which the sprockets 288 are mounted, is driven from the shaft 246' of the mechanism for driving the delivery ends of the carriers. This drive, as most clearly shown in Figs. 25 and 31, is through the chain 292, shaft 293, clutch N, pinion 294 fixed to the loose drum member 295 of clutch N, gear 296 and a chain 297. The fixed member of the clutch N is designated by the numeral 298. Loose on the shaft 293 and adjacent the clutch N is a disk 299 having a notch 302 into which a finger 303 of the pawl 304 is adapted to drop and when this pawl is in this position it holds the cam 305 so that the clutch N is disengaged (see Fig. 26). The disk 299 is driven from the shaft 289 through the chain 306 passing about a sprocket fixed to the hub of that disk. Now when the big gear 243' of the driving mechanism at the delivery end of the carrier has about completed its revolution and by which time each of the carriers has been fed forward one step to receive a fresh mandrel and to deliver the dried tubes of the first nine stages into the buckets of the receiving conveyor, a pin 309 on this gear engages and closes a switch O which momentarily closes a circuit through a solenoid P, the armature of which thereupon raises and lifts the pawl 304 permitting engagement of clutch N and the driving of the receiving conveyor. The disk 299 is being slowly rotated from the shaft 289 and holding the pawl 304 out of the path of the cam 305. When the receiving conveyor has been driven to move the bucket which has received a green tube from the first stage of the drier down to the bottom of the conveyor and bring an empty bucket in front of each of the first nine stages, the notch 302 has been brought into position beneath the finger 303, which drops thereonto thus bringing the pawl 304 into a position where it will be engaged by the cam 305 so that the clutch N will be thrown out.

The complete chain of operations of the transfer conveyor, the drier and the receiving conveyor will be very briefly described in connection with a brief explanation of the circuits through which the control of these parts is effected from the original timing mechanism of the tube forming machine.

It will be remembered that in Figs. 27 to 31, which diagrammatically show the electrical connections, the wires which are live are in heavy unbroken lines. The dead wires are shown by dot and dash lines, while the first circuit which is closed is indicated by heavy dash lines in Fig. 27. Let it be supposed that the current enters through the lead wire 400 and leaves through the negative wire 401.

When a predetermined amount of web has been wound onto a mandrel positioned at the winding point of the tube winding machine, the original timing mechanism of this machine is released whereupon the carrier wheels are advanced a step and the full mandrel being released from the chucks will roll down the receiving table n. As each and every successive tube is delivered to position on the receiving table, the original timing mechanism, through the switch A, will momentarily close that circuit which includes the wires 402 (shown in heavy dash lines, Fig. 27) and the solenoid B causing the latter to be energized which results in the engagement of the clutch C and the operation of the rack 173 to engage the chucks with the full mandrel. The switch D is then closed and the current will pass through the circuit 403 and the solenoid E as indicated by the heavy unbroken lines, Fig. 27. Upon energization of the solenoid E, the clutch F is engaged and the transfer chain is driven forward one step through this clutch. After the tenth tube has been picked up by the transfer chains and these chains start to move, the pivoted arm of the switch G is swung down by the segment 207 and at this time the switch D is still closed so that a current passes through the circuit indicated by heavy full lines Fig. 28. This circuit includes the wires 403 and the solenoid E, but the current is now passing through these wires in a direction opposite to that shown in the circuit indicated by unbroken lines Fig. 27. This circuit also includes the wires 404 which connect the solenoids H and H' in series. When this circuit is closed, the solenoids H and H' are both energized releasing the clutches I and I' respectively and setting into operation the mechanisms associated with these clutches, whereupon the gear 243 will make a partial revolution throwing the receiving arms 219 outwardly below the descending tubes on the delivery end of the transfer chains and moving the carriers forward a portion of one step. The planetary gearing then disengages the clutch I and one of the descending chuck bars will close the switch J causing the current to flow through the circuit shown in heavy full lines Fig. 29 and which circuit includes the wires 406 and the solenoid K. When this solenoid is thus energized, the clutch L is engaged and the chucks are withdrawn from the mandrels positioned above the outwardly positioned receiving arms. The next thing that happens is the switch M is closed whereupon the current will flow, as shown in Fig. 30, through the wires 407, 404 again energizing solenoids H and H' and releasing the clutches I and I' whereupon the gear 243 will complete its revolution during which time the step movement of the carrier will be completed and the receiving arms 219 will be thrown forward to deliver the tubes thereon onto the supporting rolls which have been brought into position to receive the same. Just before the gear 243' at the delivery end of the drier completes its revolution, it closes the switch O and the current will pass through a circuit including the wires 408 connected to the solenoid P, as shown in Fig. 31. When this solenoid is energized, the clutch N is released and the receiving conveyor is driven to carry all of the tubes supported thereon down to the receiving platform. When the disk 299 has completed one revolution, the notch thereof receives the finger 303 of the pawl 304 whereupon the latter will disengage the clutch N and the conveyor is brought to rest.

I claim as my invention:

1. In a machine of the character described, a pair of alined stub shafts one at each side of the machine, a carrier wheel mounted on each shaft, and pairs of alined mandrel engaging means carried by said wheels and each pair being adapted to support a mandrel therebetween and a single press roll mounted between said wheels and supported independently thereof.

2. In a machine of the character described, a pair of fixed alined stub shafts one at each side of the machine, a rigid carrier wheel rotatably mounted on each shaft, and pairs of alined mandrel engaging means carried by said carrier wheels, the mandrel engaging means on one wheel being in alinement with those on the other and a single press roll mounted between said wheels for successive operation on the mandrels carried by the several pairs of said engaging means.

3. In a machine of the character described, a pair of spaced carrier members, pairs of alined mandrel engaging means carried thereby and each pair being adapted to support a mandrel therebetween, a press roll positioned between said carrier members and within the circle comprising the path of travel of said mandrel engaging means, and lifting means therefor extending beyond the path of travel of said mandrel engaging means.

4. In a machine of the character described, a pair of alined carrier wheels, pairs of alined mandrel engaging means carried thereby and each pair being adapted to support a mandrel therebetween, a press roll positioned between said carrier wheels, lifters for said press roll, and connections between said press roll and lifters traversing the axes of rotation of said carrier wheels.

5. In a machine of the character described, a pair of rotatable alined carrier wheels, pairs of alined mandrel engaging means carried thereby and each pair being adapted to support a mandrel therebetween, a press roll positioned between said carrier wheels and within the path of travel of said mandrel engaging means, lifters for said press roll positioned beyond the path of travel of said mandrel engaging means, and connections between said press roll and lifters traversing the axes of rotation of said wheels.

6. In a machine of the character described, a pair of alined fixed stub shafts one at each side of the machine, a carrier wheel rotatably mounted on each stub shaft, pairs of alined mandrel engaging means carried thereby and each pair being adapted to support a mandrel therebetween, and a press roll movably supported on the inner ends of said stub shafts.

7. In a machine of the character described, a pair of alined fixed stub shafts one at each side of the machine, a carrier wheel rotatably mounted on each stub shaft, pairs of alined mandrel engaging means carried thereby, each pair being adapted to support a mandrel therebetween, a guide member on the inner end of each stub shaft, a slide on each guide member, and a press roll supported by said slides.

8. In a machine of the character described, a pair of alined fixed stub shafts one at each side of the machine, a carrier wheel rotatably mounted on each stub shaft, pairs of alined mandrel engaging means carried thereby, each pair being adapted to support a mandrel therebetween, a guide member on the inner end of each stub shaft, a slide on each guide member, a press roll supported by said slides, lifters for said press roll positioned beyond the path of travel of said mandrel engaging means, and connections between said lifters and said slides.

9. In a machine of the character described, a pair of alined disconnected carrier wheels spaced from one another, pairs of alined mandrel engaging means thereon, each pair being adapted to support a mandrel therebetween, and means one for each wheel for rotating said carrier wheels in unison.

10. In a machine of the character described, a pair of disconnected alined carrier wheels, pairs of alined mandrel engaging means thereon each pair being adapted to support a mandrel therebetween, driving means for each carrier wheel, and means for periodically actuating said driving means in unison.

11. In a machine of the character described, a pair of alined disconnected carrier wheels, pairs of alined mandrel engaging means thereon, each pair being adapted to support a mandrel therebetween, driving means for rotating each wheel, an intermittently rotatable shaft, and a connection between said shaft and each of said driving means for operating the latter in unison.

12. In a machine of the character described, a pair of disconnected carrier wheels, pairs of alined mandrel engaging means thereon, each pair being adapted to support a mandrel therebetween, driving means for each carrier wheel and each driving means including a pivoted dog adapted for driving engagement with the wheel when moved in one direction and inoperative when moved in the opposite direction, and means for moving said dogs in unison to impart a step by step motion to said wheels.

13. In a machine of the character described, a pair of disconnected alined carrier wheels, pairs of alined mandrel engaging means thereon, pins projecting from each carrier wheel, a pivoted arm adjacent each carrier wheel, a dog pivoted on each of said arms and adapted for engagement with said pins, a shaft, a pair of angularly alined cranks thereon, a connection between each arm and a respective crank, and means for periodically rotating said shaft.

14. In a machine of the character described, a pair of alined stub shafts one at each side of the machine, a carrier wheel rotatably mounted on each stub shaft, pairs of alined mandrel engaging means carried thereby, each pair being adapted to support a mandrel therebetween, a press roll movably supported on the inner ends of said stub shafts, means for lifting said roll, driving means for rotating each carrier wheel, and means for operating said driving means in unison.

15. In a machine of the character described, a conveyor, pairs of alined mandrel engaging means thereon, each pair being adapted to support a mandrel therebetween, means for periodically driving said conveyor, and means for locking said conveyor against movement and cooperating with said driving means to disengage the same.

16. In a machine of the character described, a conveyor, pairs of alined mandrel engaging means thereon, each pair being adapted to support a mandrel therebetween, a plurality of pins on said conveyor, means cooperating with said pins for periodically driving said conveyor, and a finger cooperating with said pins to lock the conveyor against movement.

17. In a machine of the character described, a pair of disconnected alined carrier wheels, pairs of alined mandrel engaging means thereon, each pair being adapted to support a mandrel therebetween, pins on each of said carrier wheels, means for periodically driving said wheels, a locking finger adapted to cooperate with said pins of each wheel, and means for moving said locking fingers in unison.

18. In a machine of the character described, a mandrel carrier comprising a pair of alined wheels, pairs of alined mandrel engaging means thereon, each pair being adapted to support a mandrel therebetween, a plurality of spaced projections on said carrier, a rock shaft, a pair of locking fingers arranged thereon to engage between adjacent projections on said carrier, and means for rocking said shaft.

19. In a machine of the character described, a conveyor, pairs of alined mandrel engaging means thereon, each pair being adapted to support a mandrel therebetween, a driving dog adapted for periodic engagement with said conveyor, means for actuating said dog, a locking finger for locking said conveyor against movement and adapted to disengage said dog from said conveyor, and means for operating the same.

20. In a machine of the character described, a conveyor, pairs of alined mandrel engaging means thereon, each pair being adapted to support a mandrel therebetween, equally spaced pins on said conveyor, a dog adapted for engagement with said pins to drive the conveyor, means for actuating said dog, a locking finger adapted for engagement with said pins and adapted when moved into locking position to disengage said dog therefrom, and means for operating said finger.

21. In a machine of the character described, mandrel conveying means, pairs of alined mandrel engaging means thereon, each pair being adapted to support a mandrel therebetween, an inclined mandrel support, and automatically operated means for holding a mandrel at rest on said support in position for engagement with said mandrel engaging means.

22. In a machine of the character described, a mandrel conveyor, pairs of alined mandrel engaging means thereon, each pair being adapted to support a mandrel therebetween, a downwardly inclined mandrel support terminating adjacent the path of said mandrel engaging means, means independent of said conveyor for holding at rest the mandrel on said support in position for engagement with said mandrel engaging means and operating mechanism for moving said mandrel engaging means into engagement with a mandrel so held.

23. In a machine of the character described, mandrel conveying means, pairs of alined mandrel engaging means thereon, each pair being adapted to support a mandrel therebetween, an inclined stationary mandrel support, and automatically operated means independent of said conveyor for holding mandrels on said support out of position for engagement with said mandrel engaging means during movement of the latter.

24. In a machine of the character described, mandrel conveying means, pairs of alined mandrel engaging means thereon, each pair being adapted to support a mandrel therebetween, an inclined mandrel support, means for holding mandrels on said support in position for engagement with said mandrel engaging means when said mandrel conveying means is at rest, and means for holding mandrels on said support out of engaging position with said mandrel conveying means during movement of the latter.

25. In a machine of the character described, a mandrel conveyor, pairs of alined mandrel engaging means thereon, each pair being adapted to support a mandrel therebetween, a stationary inclined mandrel support, and a pair of alternately acting stops for successively holding a mandrel on said support out of and in engaging position relative to said mandrel engaging means.

26. In a machine of the character described, mandrel conveying means, pairs of alined mandrel engaging means thereon, each pair being adapted to support a mandrel therebetween, an inclined mandrel support, a pair of stops one for maintaining a mandrel on the support out of a position where it may be engaged by said mandrel engaging means, and the other for holding the mandrel on the support in position for engagement with said mandrel engaging means, and means for alternately bringing said stops into operative positions.

27. In a machine of the character described, web winding mechanism including a press roll, means for lifting the same, a mandrel conveyor, pairs of alined mandrel engaging means thereon, each pair being adapted to support a mandrel therebetween, a mandrel support delivering to said conveyor, stops for controlling movement of mandrels on said support to a position for engagement with said mandrel engaging means, and an operative connection between said stops and said lifting means.

28. In a machine of the character described, web winding mechanism including a press roll, an inclined mandrel support, a mandrel conveyor for conveying mandrels from said support to winding position, means for raising and lowering said press roll, a pair of alternately acting stops for maintaining mandrels on said support out of and in position for engagement with said mandrel engaging means, and a connection between said stops and said press roll raising and lowering means.

29. In a machine of the character described, web winding mechanism, an inclined mandrel support, a conveyor for conveying mandrels from said support to winding position, pairs of alined mandrel engaging means on said conveyor, each pair being adapted to support a mandrel therebetween, means for controlling the movement of mandrels on said support to a position for engagement with said mandrel engaging means, means for driving said conveyor periodically, and means for operating said controlling means while said conveyor is at rest.

30. In a machine of the character described, web winding mechanism including a press roll, an inclined mandrel support, a mandrel conveyor for carrying mandrels from said support to winding position, pairs of alined mandrel engaging means on said conveyor each pair being adapted to support a mandrel therebetween, means for raising and lowering said press roll, means for driving said conveyor while said press roll is raised, and means operated by the movement of said press roll for controlling movement of said mandrels on said support to a position for engagement with said mandrel engaging means.

31. In a machine of the character described, web winding mechanism including a press roll, an inclined mandrel support, a mandrel conveyor for carrying mandrels from said support to winding position, pairs of alined mandrel engaging means on said conveyor each pair being adapted to support a mandrel therebetween, means for raising and lowering said press roll, means for driving said conveyor while said press roll is raised, a stop for maintaining a mandrel on said support in position for engagement with said mandrel engaging means, a second stop for maintaining a mandrel on said support out of such position, and a connection between said press roll raising and lowering means and said stops whereby the first stop is moved into operative position and the second stop out of operative position when the press roll is lowered, and vice versa when the press roll is raised.

32. In combination, a mandrel conveyor, pairs of alined mandrel engaging devices carried thereby, each pair being adapted to support a mandrel therebetween, and automatically operated means for actuating said devices when said conveyor is at rest.

33. In combination, a conveyor, pairs of alined mandrel engaging devices carried thereby, each pair being adapted to support a mandrel therebetween, and means for automatically actuating said devices to cause them to engage mandrels when the conveyor is at rest.

34. In combination, a conveyor, pairs of alined mandrel engaging devices carried thereby, each pair being adapted to support a mandrel therebetween, and means for automtically actuating said devices to disengage them from mandrels when said conveyor is at rest.

35. In combination, a conveyor, pairs of alined mandrel engaging devices carried thereby, each pair being adapted to support a mandrel therebetween, and means for automatically actuating said devices to engage them with and disengage them from mandrels when said conveyor is at rest.

36. In combination, a mandrel conveyor provided with pairs of alined mandrel engaging devices, each pair being adapted to support a mandrel therebetween, and positively driven means for automatically operating said devices periodically.

37. In combination, a mandrel conveyor provided with mandrel engaging chucks adapted for free longitudinal movement, and positively driven means for automatically operating said chucks.

38. In combination, a mandrel conveyor provided with mandrel engaging chucks adapted for free longitudinal movement, and positively driven means for actuating said chucks to cause them to engage mandrels.

39. In combination, a mandrel conveyor provided with mandrel engaging chucks adapted for free longitudinal movement, and positively driven means for automatically operating said chucks to disengage them from mandrels.

40. In combination, supply and discharge points, a mandrel conveyor traversing said points and provided with mandrel engaging chucks adapted for free longitudinal movement, and positively driven means for automatically operating said chucks to engage them with and disengage them from mandrels at the supply and discharge points respectively.

41. In combination, supply and discharge points, a conveyor traversing said points, pairs of alined mandrel engaging chucks carried thereby, each pair being adapted to support a mandrel therebetween, means at the supply point for actuating said chucks to cause them to engage mandrels, means at the discharge point for actuating said chucks to cause them to disengage the mandrels, and power driven means for simultaneously actuating said chuck actuating means.

42. In combination, a conveyor, pairs of alined mandrel engaging chucks thereon each pair of chucks being adapted to support a mandrel therebetween, driving means for imparting a step by step motion to said conveyor, positively driven means for actuating said chucks, and automatically operated means common to said driving means and chuck actuating means.

43. In a machine of the character described, a conveyor, pairs of alined mandrel engaging chucks thereon each pair being adapted to support a mandrel therebetween, driving means for imparting a step by step movement to said conveyor, a reciprocable plunger for actuating said chucks, and means for moving said plunger on both its operative and inoperative strokes during the period in which said conveyor is at rest.

44. In a machine of the character described, a conveyor, pairs of alined mandrel engaging chucks carried thereby each pair being adapted to support a mandrel therebetween, a stationary support for delivering mandrels to said conveyor, means for maintaining a mandrel at rest on said stationary support in a position for engagement with said chucks, and means for actuating said chucks to engage them with the mandrels while the latter are at rest.

45. In a machine of the character described, a mandrel support, a conveyor for carrying mandrels from said support, pairs of alined mandrel engaging chucks on said conveyor, each pair being adapted to support a mandrel therebetween, means for periodically driving said conveyor, means for holding a mandrel on said support in position for engagement with said chucks while said conveyor is at rest, and means for actuating said chucks to engage them with said mandrel when said conveyor is at rest.

46. In a machine of the character described, an inclined mandrel support, a conveyor for carrying a mandrel from said support, pairs of alined mandrel engaging chucks on said conveyor, each pair being adapted to support a mandrel therebetween, means for periodically driving said conveyor, positively operated means at the supply point for actuating said chucks to engage them with the mandrels, means for controlling the movement of mandrels on said support into position for engagement with said chucks, and automatically operating mechanism common to said driving means, chuck actuating means and controlling means.

47. In a machine of the character described, web manipulating mechanism including a press roll, an inclined mandrel support, a conveyor for carrying mandrels from said support to winding position, pairs of alined mandrel engaging chucks on said conveyor, each pair being adapted to support a mandrel therebetween, means for raising and lowering said press roll, means for driving said conveyor when said press roll is raised, means actuated upon movement of said press roll for controlling the movement of mandrels on said support to a position for engagement with said chucks, and means actuated when said conveyor is at rest for engaging said chucks with a mandrel positioned by said controlling means on said support.

48. In a machine of the character described, a conveyor, pairs of alined mandrel engaging chucks thereon, each pair being adapted to support a mandrel therebetween, means for periodically driving said conveyor, means for locking said conveyor against movement when the same is not driven, means for moving said chucks into and out of mandrel engaging position, and an intermittently actuated driver common to all of said means for operating the same.

49. In a machine of the character described, a conveyor, pairs of alined mandrel engaging chucks thereon each pair being adapted to support a mandrel therebetween, a support for delivering mandrels to said conveyor, means for driving said conveyor with a step by step movement, means for locking said conveyor against movement when the same is not driven, means for controlling the movement of mandrels on said support to a position for engagement with said chucks, a rotatable driving member operatively connected to each of said means, and means for periodically starting and stopping said member.

50. In a machine of the character described, web manipulating mechanism including a press roll, means for raising and lowering the same, a conveyor for carrying mandrels to the manipulating point of said web manipulating mechanism, means for driving said conveyor with a step by step motion, means in addition to said driving means and operated in timed relation therewith for locking said conveyor against movement when the same is not driven, and an intermittently actuated driver connected to each of said means.

51. In a machine of the character described, web manipulating mechanism including a press roll, a mandrel conveyor, pairs of alined mandrel engaging chucks, each pair being adapted to support a mandrel therebetween, means for raising and lowering said press roll, means for driving said conveyor with a step by step motion, positively operated means for actuating said chucks to engage them with and disengage them from mandrels, and an intermittently actuated driver common to all of said means.

52. In a machine of the character described, web manipulating mechanism including a press roll, mandrel conveying mechanism, means for driving the same when the press roll is raised, pairs of alined mandrel engaging means on said conveyor, and means for operating the same when the conveyor is at rest.

53. In a machine of the character described, a conveyor, means for driving the same, means for locking said conveyor against movement while said driving means are inactive, mandrel supporting devices on said conveyor, positively operated means for operating said devices, a mandrel support, means for controlling the movement of mandrels on said support to a position for engagement with said mandrel supporting devices, and an intermittently actuated driver common to all of said means.

54. In a machine of the character described, a base roll, a press roll, lifting means therefor, a conveyor, means for driving the same, means for locking said conveyor against movement while said driving means are inactive, mandrel supporting devices on said conveyor mechanism, positively operated means for moving said devices into and out of mandrel engaging position, and an intermittently actuated driver common to all of said means.

55. In a machine of the character described, web manipulating mechanism including a base roll and a press roll, an inclined mandrel support, a conveyor for carrying mandrels from said support to winding position, mandrel engaging chucks on said conveyor, means for lifting said press roll, means controlled by the movement of said press roll for controlling the movement of mandrels on said support to a position for engagement with said chucks, means for driving said conveyor when said press roll is raised, means in addition to said driving means and operated in timed relation therewith for locking said conveyor against movement when said driving means are inactive, and means for actuating said chucks.

56. In a machine of the character described, supply and discharge points, a conveyor transversing said points, mandrel engaging chucks carried thereby and adapted for free longitudinal movement whereby each chuck will remain unaided in mandrel engaging position and out of engaging position, and a guard between said supply and discharge points engaging said chucks for maintaining the same in mandrel engaging position.

57. In a machine of the character described, supply, manipulating and discharge points, a conveyor traversing said points, mandrel holding chucks carried thereby and adapted for free longitudinal movement, means at the supply point for engaging said chucks with the mandrels, means at the discharge point for disengaging the chucks from the mandrels, and means between the supply and discharge points for maintaining said chucks in engagement with the mandrels.

58. In a machine of the character described, a base roll and a press roll between which winding takes place, slides at each side of the machine, bearings for said press roll mounted in said slides, a swinging frame, a connection between said slides and frame, lifting means, and a connection between said swinging frame and lifting means including a cooperating cylinder and piston arranged to permit said press roll and swinging frame to move independently of said lifting means during the winding operation and causing the press roll and swinging frame to move with said lifting means during operation of the latter.

59. In a machine of the character described, a base roll and a press roll between which winding takes place, lifting means for said press roll, a lever pivoted to said lifting means, a dash pot having a cylinder member and a piston member one of which members is connected to said lever, and a connection between said press roll and lever, said lever being fulcrumed on said lifting means during the winding operation and being fulcrumed on said dash pot when the lifting means is operated.

60. In a machine of the character described, a base roll and a press roll between which winding takes place, lifting means, a lever pivoted to said lifting means, a dash pot having cooperating cylinder and piston members one of which is connected to said lever and the other of which is relatively anchored, and a connection between said press roll and said lever connected to said lever at a point between the lifting means and said dash pot.

61. In a machine of the character described, a base roll and a press roll between which winding takes place, slidable bearings at each side of the machine in which said press roll is mounted, a swing frame, a connection between said swinging frame and slidable bearings, lifting means, a lever pivoted to said lifting means, a link between said lever and swinging frame, and a dash pot having cooperating cylinder and piston members one of which is connected to the swinging frame and the other of which is connected to said lever.

62. In a machine of the character described, a base roll and a press roll between which winding takes place, slidable bearings in which the press roll is mounted, a pivoted frame to which said bearings are connected, lifting means, a lever pivotally connected thereto, a cylinder and piston connection between said lever and swinging frame, and a link connected to the free end of said swinging frame and to said lever at a point between said lifting means and cylinder and piston connection.

63. In a machine of the character described, a base roll and a press roll between which winding takes place, lifting means for said press roll, a lever pivoted to said lifting means, a dash pot having a cylinder member and a piston member one of which members is connected to said lever, a connection between said press roll and lever, said lever being fulcrumed on said lifting means during the winding operation and being fulcrumed on said dash pot when the lifting means is operated, automatically operated means for periodically actuating said lifting means, and means operable by the movement of said lever during the winding operation for releasing said automatically operated means.

64. In a machine of the character described, a web breaker, intermittently rotatable controlling means therefor, mandrel conveying means, intermittently actuated driving mechanism therefor, a constantly driven gear adapted for periodic connection with said controlling means, a constantly driven member adapted for periodic connection with said driving means, automatically operated means for periodically connecting said controlling means to its constantly driven member, and means including a constantly driven gear and a clutch member adapted for periodic engagement therewith controlled by said controlling means and in turn controlling the periodic engagement of said driving mechanism with its constantly driven member.

65. In a machine of the character described, a web breaker, intermittently rotatable controlling means therefor, mandrel conveying means, intermittently actuated driving mechanism therefor, a constantly driven member for said controlling means, a constantly driven member for said driving mechanism, automatically operated means for connecting said controlling means and its driven member, a constantly rotating member, and an intermittently rotating member adapted for periodic engagement therewith, means controlled by said controlling means for periodically connecting said intermittently rotatable part with its constantly rotating member, and means controlled by said intermittently rotating member for periodically connecting said driving mechanism to its constantly driven member.

66. In a machine of the character described, a web breaker, intermittently rotatable controlling means therefor including a clutch member, mandrel conveying means, intermittently actuated driving mechanism therefor including a clutch member, a constantly driven gear associated with each of said clutch members, an intermediate constantly driven gear and a clutch drum therefor, automatically operated means for connecting the clutch member of said controlling means to its gear, means on said last mentioned clutch member controlling the connection of said drum to its driven gear, and means on said drum controlling the connection of said clutch member of said driving mechanism to its gear.

67. In a machine of the character described, a tube carrier, a plurality of shafts, a constantly driven gear on each shaft, a clutch member fixed to each shaft and associated with the respective gears thereon, means for periodically engaging each clutch member with its respective gear, and means rotatable with each clutch member for releasing the engaging means of successive clutch members and means associated with one of said shafts for actuating said carrier.

68. In a machine of the character described, an article carrier, three shafts, a constantly driven gear loose on each shaft, a clutch member fixed to each shaft and associated with the respective gears thereon, a pawl for engaging each clutch member with its respective gear, a cam associated with each pawl and normally holding the same in disengaged position, automatically operated means for actuating one of said cams to permit the rotation of the clutch member associated therewith, means rotatable with the last mentioned clutch member for actuating the cam of the succeeding clutch member, and means rotatable with the second clutch member for releasing the cam of the third clutch member and means associated with one of said shafts for actuating said carrier.

69. In a machine of the character described, a plurality of rolls adapted to support a mandrel therebetween, a web carrying felt passing about one of said rolls, and separate absorbent felts passing about the other rolls.

70. In a machine of the character described, a pair of base rolls and a press roll adapted to support a mandrel therebetween, a web carrying felt passing about the first base roll, and separate absorbent felts passing about the other base roll and said press roll.

71. In a machine of the character described, a web conveyor with a web of pulp thereon, a web breaker, and means for moving said breaker in the same direction as the movement of said web but faster.

72. In a machine of the character described, a web conveyor to supply a web of pulp, a web breaker adapted for engagement therewith, and means for moving said breaker in the direction of travel of said web when raised out of contact therewith.

73. In a machine of the character described, a web conveyor to supply a web of pulp, a breaker roll adapted for engagement therewith, and means for moving said roll in the direction of travel of said web when raised out of contact therewith.

74. In a machine of the character described, a conveyor with a web of pulp thereon, a breaker roll adapted for engagement therewith, means for positively driving said roll at substantially the same speed as said web, and means for moving said roll in the direction of travel of said web when raised out of contact therewith.

75. In a machine of the character described, a web conveyor to supply a web of pulp, a pivotally mounted carrier, a breaker roll supported thereby, and means for moving said carrier in a direction to move said roll forwardly when breaking the web.

76. In a machine of the character described, a web conveyor to supply a web of pulp, a pivoted carrier, a breaker roll carried thereby and adapted for engagement with said web, means for vertically raising said carrier, and means for swinging said carrier about its fulcrum.

77. In a machine of the character described, a web conveyor with a web of pulp thereon, a pivoted carrier, a breaker roll carried thereby and adapted for engagement with said web, means for vertically raising said carrier, and means for swinging said carrier about its fulcrum, one at least of said means being adjustable to vary the operation thereof relative to the other of said means.

78. In a machine of the character described, a web conveyor to supply a web of pulp, a pivoted carrier, a breaker roll carried thereby and adapted for engagement with said conveyor, means for positively driving said roll, means including an adjustable cam for raising said carrier, and means including an adjustable cam for swinging said carrier forwardly about its fulcrum.

79. A tube forming machine including a conveyor, a drier to receive the products of said tube forming machine and including a carrier for moving said products therethrough, said carrier being separate from said conveyor, and operating mechanism for said carrier controlled by the operation of said tube forming machine.

80. A tube forming machine having movable operative parts and including a conveyor, a drier having a carrier adapted to receive the products of said forming machine, driving mechanism for said conveyor, separate driving mechanism for said carrier, and an electrical system of control through which said tube forming machine controls the driving mechanism of said carrier.

81. A tube forming machine including web winding mechanism, a drier to receive the products of said tube forming machine and including means for moving said products therethrough, and operating mechanism for said means controlled by the amount of web delivered to said winding mechanism.

82. A tube forming machine including web winding mechanism and timing mechanism therefor, a drier to receive the products of said tube forming machine and including means for moving said products therethrough, and operating mechanism for said means controlled by said timing mechanism.

83. A tube forming machine including movable operative parts, a drier having a plurality of stages each including a periodically movable carrier to receive the products of said tube forming machine, and means controlled by the operation of said tube forming machine for producing the periodic movement of said carriers.

84. A tube forming machine having a conveyor, a tube drying machine having an intermittently actuated carrier, a transfer mechanism receiving tubes from said conveyor and delivering them to said carrier, and operating means for said transfer mechanism controlled by the operation of said tube forming machine.

85. A tube forming machine having a conveyor, a tube drying machine having an intermittently actuated carrier, a transfer mechanism receiving tubes from the conveyor and delivering them to the carrier, and operating means for said transfer mechanism electrically controlled by the operation of said forming machine.

86. A tube forming machine including web winding mechanism, a drying machine, a transfer mechanism receiving tubes from said forming machine and delivering them to said drying machine, and operating means for said transfer mechanism controlled by the amount of web delivered to said winding mechanism.

87. A tube forming machine including movable operative parts, a drier including means for moving tubes therethrough, a transfer mechanism receiving tubes from said forming machine and delivering them to said means, and operating mechanism for said transfer mechanism and said means controlled by the operation of said forming machine.

88. A tube forming machine including movable operative parts, a drier including periodically actuated means for moving tubes therethrough, a transfer mechanism receiving tubes from said forming machine and delivering them to said means, and periodically operating mechanism for said transfer mechanism and said means electrically controlled by the operation of said forming machine.

89. A tube forming machine including web winding mechanism, a drier including means for moving tubes therethrough, a transfer mechanism receiving tubes from said forming machine and delivering them to said means, and operating mechanism for said transfer mechanism and said means controlled by the amount of web delivered to said winding mechanism.

90. A tube forming machine including movable operative parts, a tube drying machine including a carrier, a transfer mechanism receiving tubes from said forming machine and delivering them to said carrier, means for periodically driving said transfer mechanism, and means for periodically driving said carrier, both of said driving means being controlled by the operation of said forming machine.

91. A tube forming machine including web winding mechanism, means for conveying mandrels to and from said winding mechanism, and timing means therefor controlled by the amount of web delivered to said mechanism; a drier having a tube carrier and means for periodically driving the same; and transfer mechanism receiving tubes from said forming machine and delivering them to said carrier and means for periodically driving said transfer mechanism; both of said driving means being controlled by said timing means.

92. A tube forming machine including a timing mechanism, a tube drying machine having a carrier, transfer mechanism for receiving tubes from said forming machine and delivering them to said drying machine, means controlled by said timing mechanism for periodically driving said transfer mechanism, and means controlled by said transfer mechanism for periodically driving said carrier.

93. A tube forming machine, a drier having a plurality of stages, a transfer conveyor interposed therebetween to receive tubes from said tube forming machine and convey them opposite the stages of said drier, means for stepping said conveyor ahead each time a tube is delivered thereto, and means for simultaneously delivering the tubes to the drier stages operable each time a predetermined number of tubes have been delivered to said transfer conveyor.

94. A tube forming machine, a tube drying machine having a plurality of stages, and transfer mechanism receiving tubes one by one from said tube forming machine and delivering a plurality of them simultaneously one to each stage, the delivery of said tubes to the stages of the drier occurring every time the number of tubes received by the transfer mechanism corresponds to the number of stages of the drier.

95. A tube forming machine, a tube drying machine having a plurality of stages each including a carrier, and transfer mechanism receiving tubes one by one from said tube forming machine and delivering a plurality of them simultaneously one to the carrier of each stage.

96. A tube forming machine, a tube drying machine having a plurality of stages each including means for moving the tubes therethrough, transfer mechanism receiving tubes one by one from said tube forming machine and delivering a plurality of them simultaneously one to each stage, and operating means for said transfer mechanism controlled by the operation of said forming machine.

97. A tube forming machine, a tube drying machine having a plurality of stages each including a carrier, transfer mechanism receiving tubes one by one from said forming machine and delivering a plurality of them simultaneously one to the carrier of each stage, and operating means for said transfer mechanism and said carriers controlled by the operation of said forming machine.

98. A tube forming machine including web winding mechanism, a drying machine having a plurality of stages each including a carrier, a transfer mechanism receiving tubes from said forming machine and delivering a plurality of them simultaneously one to the carrier of each stage, and operating means for said transfer mechanism and drying machine electrically controlled by the amount of web delivered to said winding mechanism.

99. A tube forming machine including web winding mechanism, a tube drier having a plurality of stages each including a carrier, a transfer mechanism including a conveyor receiving tubes one by one from said forming machine and delivering a plurality of them simultaneously one to the carrier of each stage, means for periodically driving said transfer conveyor each time a tube is delivered thereto, and means for driving said carriers each time tubes are delivered thereto, both of said driving means being controlled by the amount of web delivered to said winding mechanism.

100. A tube forming machine including web winding mechanism, means for conveying mandrels to and from said mechanism and timing mechanism controlled by the amount of web supplied to said winding mechanism; a drier having a plurality of stages each including a carrier and means for moving said carriers each time tubes are delivered thereto; a transfer mechanism for receiving tubes one by one from said forming machine and delivering a plurality of them simultaneously one to the carrier of each stage, and means controlled by said timing mechanism for periodically driving said transfer mechanism.

101. A tube forming machine including a timing mechanism, a tube drying machine having a plurality of stages each including a carrier, a transfer mechanism for receiving tubes from said forming machine and delivering a plurality of them simultaneously one to each carrier, means controlled by said timing mechanism for periodically driving said transfer mechanism, and means controlled by said transfer mechanism for periodicaly driving said carriers.

102. A tube forming machine, a drying machine having a plurality of stages each including a carrier, a transfer conveyor having a supply point to which said forming machine delivers and a plurality of discharge points one in front of each carrier, means for stepping said transfer conveyor forward each time a tube is delivered thereto from said forming machine, and means for stepping said carriers forward each time tubes are delivered thereto from said transfer conveyor.

103. A tube forming machine, a drying machine having a plurality of stages each including a carrier, a transfer conveyor having a supply point to which said forming machine delivers and a plurality of discharge points one in front of each carrier, periodically actuated means controlled by the operation of said tube forming machine for moving said transfer conveyor forward each time a tube is delivered thereto from said forming machine, and automatically actuated means for moving said carriers forward each time tubes are delivered thereto from said transfer conveyor.

104. A tube forming machine, a drying machine having a plurality of stages each including a carrier, a transfer conveyor having a supply point to which said forming machine delivers and a plurality of discharge points one in front of each carrier, means for moving said transfer conveyor forward each time a tube is delivered thereto from said forming machine, and means for moving said carriers forward each time tubes are delivered thereto from said transfer conveyor, both of said means being controlled by the operation of said tube forming machine.

105. A tube forming machine, a drier having a plurality of stages, a transfer mechanism including a conveyor receiving tubes from said forming machine and shifting mechanism to move the tubes from said conveyor to said stages, means for moving said conveyor each time a tube is delivered thereto from said forming machine, and means for actuating said shifting mechanism each time the number of tubes delivered to said conveyor corresponds to the number of stages of the drier.

106. A tube forming machine, a drier having a plurality of stages each including a carrier, transfer mechanism including a conveyor receiving tubes from said tube forming machine and shifting mechanism to move the tubes from said conveyor to said carriers, means for moving said transfer conveyor each time a tube is delivered thereto from said tube forming machine, means for actuating said shifting mechanism each time the number of tubes delivered to said conveyor corresponds to the number of stages of the drier, and means for moving said carriers each time tubes are delivered thereto.

107. A tube forming machine, a drier having a plurality of stages each including a carrier, a transfer mechanism including a conveyor for receiving tubes from said tube forming machine and mechanism at each stage for shifting the tubes from said conveyor to said carriers, and means controlled by the operation of said tube forming machine for actuating said transfer mechanism.

108. A tube forming machine, a drier having a plurality of stages each including a carrier, a transfer mechanism including a conveyor for receiving tubes from said tube forming machine and mechanism at each stage for shifting tubes from said conveyor to said carriers, means for moving said transfer conveyor each time a tube is delivered thereto from said tube forming machine, and means controlled by the operation of said tube forming machine for actuating said shifting mechanisms each time the number of tubes delivered to said conveyor corresponds to the number of stages of the drier.

109. A tube forming machine including web winding mechanism and timing mechanism therefor controlled by the amount of web delivered to said winding mechanism, a drier having a plurality of stages each including a carrier, a transfer mechanism including a conveyor receiving tubes from said forming machine and mechanism at each stage for shifting tubes from said conveyor to said carriers, means for periodically moving said transfer conveyor, and means for periodically actuating said shifting mechanisms, both of said means being controlled from said timing mechanism.

110. A tube forming machine including web winding mechanism and timing mechanism therefor, a drier having a plurality of stages each including a carrier, a transfer mechanism including a conveyor for receiving tubes from said tube forming machine and mechanism at each stage for shifting tubes from said conveyor to said carriers, means for moving said transfer conveyor each time a tube is delivered thereto from said tube forming machine, and means for actuating said shifting mechanisms each time the number of tubes delivered to said conveyor corresponds to the number of stages of the drier, both of said means being electrically controlled from said timing mechanism.

111. A tube forming machine, a drier having a plurality of stages each including a carrier and driving means therefor, a transfer mechanism including a conveyor for receiving tubes from said tube forming machine and mechanism at each stage for shifting tubes from said conveyor to said carriers, driving means for said conveyor, and operating means for said shifting mechanisms, all of said means being controlled by the operation of said tube forming machine.

112. A tube forming machine, a drier having a plurality of stages each including a carrier, a transfer mechanism including a conveyor receiving tubes from said tube forming machine and rocking arms one at each stage for shifting tubes from said conveyor to said carriers, means for moving said transfer conveyor each time a tube is delivered thereto from said tube forming machine, and means for actuating said arms to convey tubes from said conveyor to said carriers each time the number of tubes delivered to said conveyor corresponds to the number of stages of the drier.

113. A tube forming machine, a drying machine, a transfer conveyor having a supply point to which said tube forming machine delivers and a discharge point in front of said drying machine, mandrel holding devices on said conveyor, means for periodically driving said conveyor, means at the supply point for engaging said holding devices with mandrels supplied thereto from said tube forming machine, and means at the discharge point for disengaging said holding devices from the mandrels, all of said means being controlled by the operation of said tube forming machine.

114. A tube forming machine including web winding mechanism, a drying machine including means for moving the products of the tube forming machine thereto, a transfer conveyor having a supply point to which said tube forming machine delivers and a discharge point from which tubes are delivered to said means of the drying machine, mandrel holding devices on said conveyor traversing said supply and discharge points, means for periodically driving said conveyor, means at the supply point for engaging said devices with mandrels supplied thereto, and means at the discharge point for disengaging said devices from the mandrels, all of said means being controlled by the amount of web delivered to said winding mechanism.

115. A tube forming machine including web winding mechanism and timing mechanism therefor controlled by the amount of web delivered to said winding mechanism, a drier including a carrier, a transfer conveyor having a supply point to which said tube forming machine delivers and a discharge point from which the tubes are delivered to said carrier, holding devices on said conveyor traversing said supply and discharge points, means at the supply point for engaging said devices with mandrels supplied thereto, and means at the discharge point for disengaging said holding devices from the mandrels, both of said means being electrically controlled from said timing mechanism.

116. A tube forming machine, a drier having a carrier, a transfer conveyor having a supply point to which said tube forming machine delivers and a discharge point from which the tubes are delivered to said carrier, mandrel holding devices on said conveyor traversing said supply and discharge points, means controlled by the operation of said tube forming machine for engaging said holding devices with mandrels delivered to said supply point, means controlled by said last mentioned means for periodically driving said conveyor, and means controlled by said conveyor for periodically driving said carrier.

117. A tube forming machine, a drying machine including a carrier, a transfer conveyor having a supply point to which said tube forming machine delivers and a discharge point from which said tubes are discharged to said carrier, mandrel holding devices on said conveyor traversing said supply and discharge points, means at the supply point for engaging said holding devices with mandrels supplied thereto, operating means for said engaging means controlled by the operation of said tube forming machine, means controlled by said operating means for driving said conveyor step by step, means at the discharge point for disengaging said holding devices from the mandrels, operating means therefor controlled by said conveyor, and driving means for said carrier controlled by said conveyor.

118. A tube forming machine, a drier having a plurality of stages each including a carrier, a transfer conveyor having a supply point to which said forming machine delivers and a plurality of discharge points one in front of each carrier, mandrel holding devices on said conveyor traversing said supply and discharge points, means for periodically driving said conveyor, means at the supply point for engaging said devices with mandrels supplied thereto, and means at the discharge points for disengaging said devices from the mandrels, all of said means being controlled by the operation of said tube forming machine.

119. A tube forming machine, a drying machine including a carrier, a transfer conveyor having a supply point to which said tube forming machine delivers and a discharge point in front of said carrier, holding devices on said conveyor traversing said supply and discharge points, means for periodically driving said conveyor, means at the supply point for engaging said holding devices with mandrels supplied thereto from said tube forming machine, means at the discharge point for disengaging said holding devices from the mandrels, mechanism for shifting said tubes from said discharge point to said carrier and operating means therefor, all of said means being controlled by the operation of said tube forming machine.

120. A tube forming machine, a drying machine having a plurality of stages each including a carrier, a transfer conveyor provided with mandrel holding devices and having a supply point to which said tube forming machine delivers and a plurality of discharge points, one in front of each carrier, means for periodically driving said conveyor, means at the supply point for engaging said holding devices with mandrels supplied thereto from said tube forming machine, means at said discharge points for disengaging said holding devices from the mandrels, and means for shifting tubes from said discharge points to said carriers, all of said means being controlled by the operation of said tube forming machine.

121. A tube forming machine including web winding mechanism, a drying machine having a plurality of stages each including a carrier and means for periodically driving the same, a transfer conveyor having a supply point to which said tube forming machine delivers and a plurality of discharge points, one in front of each carrier, mandrel holding devices on said conveyor traversing said supply and discharge points, means for periodically driving said conveyor, means at the supply point for engaging said devices with mandrels supplied thereto, means at the discharge points for disengaging said devices from the mandrels, and means for shifting the tubes from said discharge points to said carriers, all of said means being controlled by the amount of web supplied to said winding mechanism.

122. A tube forming machine including web winding mechanism and timing mechanism therefor controlled by the amount of web supplied to said winding mechanism, a drying machine having a plurality of stages each including a carrier, a transfer conveyor having a supply point to which said tube forming machine delivers and a plurality of discharge points, one in front of each carrier, mandrel holding devices on said conveyor traversing said supply and discharge points, means for periodically driving said conveyor, means at the supply point for engaging said devices with mandrels supplied thereto, means at the discharge points for disengaging said devices from the mandrels, rocking arms for shifting tubes from each discharge point to the respective carrier, and operating means for said arms, all of said means being controlled from said timing mechanism.

123. A tube forming machine, a drier having a plurality of stages each including a carrier, a transfer conveyor having a supply point to which said tube forming machine delivers and a plurality of discharge points, one in front of each carrier, mandrel holding devices on said conveyor traversing said supply and discharge points, means at the supply point controlled by the operation of said tube forming machine for engaging said holding devices with mandrels supplied thereto, means controlled by said last mentioned means for periodically driving said conveyor, means at the discharge points controlled by the movement of said conveyor for disengaging said holding devices from the mandrels, mechanisms for shifting the tubes from said discharge points to the respective carriers, and means controlled by said disengaging means for operating said shifting mechanisms.

124. A tube forming machine, a drier having a plurality of stages each including a carrier, a transfer conveyor having a supply point to which said tube forming machine delivers and a plurality of discharge points, one in front of each carrier, mandrel holding devices on said conveyor traversing said supply and discharge points, means at the supply point controlled by the operation of said tube forming machine for engaging said holding devices with mandrels supplied thereto, means controlled by said last mentioned means for driving said conveyor, means at the discharge points controlled by the movement of said conveyor for disengaging said holding devices from the mandrels, arms for shifting mandrels from the discharge points to said carriers, and operating means for said arms controlled by said driving means for said conveyor and also by the operation of said disengaging means.

125. A tube forming machine, a drying machine having a plurality of stages each including a carrier and driving means therefor, a transfer conveyor having a supply point to which said tube forming machine delivers and a plurality of discharge points, one in front of each carrier, holding devices on said conveyor traversing said supply and discharge points, means for periodically driving said conveyor, means at the supply point for engaging said holding devices with mandrels supplied thereto, means at the discharge points for disengaging said holding devices from the mandrels, and means for shifting mandrels from said discharge points to said carriers, all of said means being controlled by the operation of said tube forming machine.

126. A tube forming machine including movable operative parts, a drier to receive the tubes of said forming machine and including means for moving said tubes thereto, a receiving conveyor to which said drier discharges, and means for periodically moving said conveyor, both of said means being controlled by the operation of said tube forming machine.

127. A tube forming machine, a drier having a plurality of carriers adapted to simultaneously receive the products of said forming machine, means for driving said carriers, a receiving conveyor to which said carriers simultaneously discharge, and means for driving said receiving conveyor, both of said means being controlled by the operation of said tube forming machine.

128. A tube forming machine including web winding mechanism, a drier including a carrier and means for driving the same, transfer mechanism receiving tubes from said forming machine and delivering them to said carrier, operating means for said transfer mechanism, a receiving conveyor to which said carrier discharges, and means for driving said receiving conveyor, all of said means being controlled by the amount of web delivered to said winding mechanism.

129. A tube forming machine, a drier having a plurality of stages each including a carrier, transfer mechanism receiving tubes one by one from said tube forming machine and delivering a plurality of them simultaneously one to the carrier of each stage, and a receiving conveyor to which said carriers simultaneously discharge.

130. A tube forming machine, a drying machine having a plurality of stages each including a carrier and driving means therefor, transfer mechanism receiving tubes one by one from said tube forming machine and delivering a plurality of them simultaneously one to the carrier of each stage, operating means for said transfer mechanism, a receiving conveyor to which said carriers simultaneously discharge, and means for driving said receiving conveyor, all of said means being controlled by the operation of said tube forming machine.

131. A tube forming machine, a tube drying machine having a plurality of stages each including a carrier transfer mechanism receiving tubes one by one from said tube forming machine and delivering a plurality of them simultaneously one to the carrier of each stage, a receiving conveyor to which said carriers simultaneously discharge, operating means for said transfer mechanism controlled by the operation of said tube forming machine, driving means for said carriers controlled by the operation of said transfer mechanism, and driving means for said receiving conveyor controlled by the driving means for said carriers.

132. A tube forming machine, a drier having a plurality of stages each including a carrier, a transfer mechanism including a transfer conveyor receiving tubes from said forming machine and shifting mechanism to move the tubes from said conveyor to said carriers, a receiving conveyor to which said carriers simultaneously discharge, means for moving said transfer conveyor each time a tube is delivered thereto from said tube forming machine, means for actuating said shifting mechanism each time the number of tubes delivered to the conveyor corresponds to the number of stages of the drier, means for driving said carriers each time tubes are delivered thereto, and means for driving said receiving conveyor each time tubes are delivered thereto from said carriers.

133. A tube forming machine including movable operative parts and driving mechanism therefor, a drier having a carrier adapted to receive the products of said tube forming machine, driving mechanism for said carrier and arranged to operate at different intervals than said driving means of said forming machine, and a system of control through which the operation of the tube forming machine controls the driving means of said carrier.

134. A tube forming machine including movable operative parts, a drier having a plurality of stages each including a periodically movable carrier to receive the products of said tube forming machine, and means associated with said tube forming machine and said periodically movable carriers to control the periodic movement of said carriers.

135. A tube forming machine having operative parts and including a conveyor and means for driving the same, a drier having carrier mechanism and means for driving the same, transfer mechanism receiving tubes from the forming machine and delivering them to said drier, and a system of control through which the conveyor, then the transfer mechanism and then the carrier are operated in sequence.

136. A tube forming machine, a drier having a plurality of stages, a transfer mechanism including a conveyor receiving tubes from said forming machine, shifting mechanism to move the tubes from said conveyor to said stages, means for moving said conveyor each time a tube is delivered thereto from said forming machine, and means for actuating said shifting mechanism.

137. A tube forming machine, a drying machine, a transfer conveyor having a supply point to which said tube forming machine delivers and a discharge point in front of said drying machine, mandrel holding devices on said conveyor, means for periodically driving said conveyor, means at the supply point for engaging said holding devices with mandrels supplied thereto from said tube forming machine, and means at the discharge point for disengaging said holding devices from the mandrels.

138. A tube forming machine and operating means therefor, a drying machine having driving means, a transfer conveyor having a supply point to which said tube forming machine delivers and a discharge point in front of said drier, means for driving said conveyor, mandrel holding devices on said conveyor, means at the supply point for engaging said holding devices with mandrels supplied thereto from said tube forming machine, means at the discharge point for disengaging said holding devices from the mandrels, and a system of control through which all of said means are operated in proper sequence.

139. A tube forming machine including web winding mechanism and a timing mechanism therefor controlled by the amount of web delivered to said winding mechanism, a drier including a carrier, a transfer conveyor having a supply point to which said tube forming machine delivers and a discharge point from which the tubes are delivered to said carrier, holding devices on said conveyor traversing said supply and discharge points, means at the supply point for engaging said devices with mandrels supplied thereto, and means at the discharge point for disengaging said holding devices from the mandrels.

140. A tube forming machine, a drier having a plurality of stages each including a carrier, a transfer conveyor having a supply point to which said forming machine delivers and a plurality of discharge points one in front of each carrier, mandrel holding devices on said conveyor traversing said supply and discharge points, means for periodically driving said conveyor, means at the supply point for engaging said devices with mandrels supplied thereto, and means at the discharge points for disengaging said devices from the mandrels.

141. A tube forming machine, a drying machine including a carrier, a transfer conveyor having a supply point to which said tube forming machine delivers and a discharge point in front of said carrier, holding devices on said conveyor traversing said supply and discharge points, means for periodically driving said conveyor, means at the supply point for engaging said holding devices with mandrels supplied thereto from said tube forming machine, means at the discharge point for disengaging said holding devices from the mandrels, mechanism for shifting said tubes from said discharge point to said carrier, and operating means therefor.

142. A tube forming machine including web winding mechanism, a drying machine having a plurality of stages each including a carrier and means for periodically driving the same, a transfer conveyor having a supply point to which said tube forming machine delivers and a plurality of discharge points, one in front of each carrier, mandrel holding devices on said conveyor traversing said supply and discharge points, means for periodically driving said conveyor, means at the supply point for engaging said devices with mandrels supplied thereto, means at the discharge points for disengaging said devices from the mandrels, means for shifting the tubes from said discharge points to said carriers, and a system of control for all of said means through which the same are operated in proper sequence.

143. A tube forming machine, a drier having a plurality of stages each including a carrier, a transfer conveyor having a supply point to which said tube forming machine delivers and a plurality of discharge points, one in front of each carrier, mandrel holding devices on said conveyor traversing said supply and discharge points, means at the supply point controlled by the operation of said tube forming machine for engaging said holding devices with mandrels supplied thereto, means controlled by said last mentioned means for driving said conveyor, means at the discharge points controlled by the movement of said conveyor for disengaging said holding devices from the mandrels, arms for shifting mandrels from the discharge points to said carriers, and operating means for said arms controlled by the operation of said conveyor.

144. A tube forming machine including movable operative parts, a drier to receive the tubes of said forming machine and including means for moving said tubes therethrough, a receiving conveyor to which said drier discharges, and means for periodically moving said conveyor.

145. A tube forming machine, a drier having a plurality of carriers adapted to simultaneously receive the products of said forming machine, means for driving said carriers, a receiving conveyor to which said carriers simultaneously discharge, and means for driving said receiving conveyor.

146. A tube forming machine including web winding mechanism, a drier including a carrier and means for driving the same, transfer mechanism receiving tubes from said forming machine and delivering them to said carrier, operating means for said transfer mechanism, a receiving conveyor to which said carrier discharges, and means for driving said receiving conveyor.

147. In a machine of the character described, a conveyor, pairs of alined mandrel engaging chucks carried thereby, each pair being adapted to support a mandrel therebetween, means for delivering mandrels to said conveyor, means for maintaining a mandrel at rest on said delivering means in position for engagement with said chucks, and power operated movable means for actuating said chucks to engage them with the mandrels while the latter are at rest.

148. In a machine of the character described, supply, manipulating and discharge points, a conveyor traversing said points, mandrel holding chucks carried thereby and adapted for free longitudinal movement, positively operable movable means at the supply point for engaging said chucks with the mandrels, positively operable movable means at the discharge point for disengaging the chucks from the mandrels, and means between the supply and discharge points for maintaining said chucks in engagement with the mandrels.

HOWARD PARKER.